United States Patent
Piecko et al.

(10) Patent No.: US 11,966,419 B2
(45) Date of Patent: Apr. 23, 2024

(54) SYSTEMS AND METHODS FOR COMBINING DATA ANALYSES

(71) Applicant: DataWalk Spólka Akcyjna, Wroclaw (PL)

(72) Inventors: Krystian Piecko, Herndon, VA (US); Bartosz Kolasa, Wroclaw (PL)

(73) Assignee: DataWalk Spólka Akcyjna, Wroclaw (PL)

( * ) Notice: Subject to any disclaimer, the term of this patent is extended or adjusted under 35 U.S.C. 154(b) by 0 days.

(21) Appl. No.: 16/907,521

(22) Filed: Jun. 22, 2020

(65) Prior Publication Data

US 2020/0320100 A1 Oct. 8, 2020

Related U.S. Application Data

(63) Continuation of application No. PCT/EP2018/085190, filed on Dec. 17, 2018.

(60) Provisional application No. 62/611,033, filed on Dec. 28, 2017.

(51) Int. Cl.
*G06F 16/28* (2019.01)
*G06F 16/242* (2019.01)
*G06F 16/2457* (2019.01)
*G06F 16/25* (2019.01)
*G06F 16/2455* (2019.01)

(52) U.S. Cl.
CPC ........ *G06F 16/284* (2019.01); *G06F 16/2428* (2019.01); *G06F 16/2457* (2019.01); *G06F 16/252* (2019.01); *G06F 16/2456* (2019.01)

(58) Field of Classification Search
None
See application file for complete search history.

(56) References Cited

U.S. PATENT DOCUMENTS 7,765,227 B1 * 7/2010 Khoshnevisan .... G06F 16/9535
707/769
8,024,326 B2 9/2011 Tong et al.
(Continued)

FOREIGN PATENT DOCUMENTS

| KR | 20120057786 A | * | 6/2012 |
| WO | WO-2017186774 A1 | | 11/2017 |
| WO | WO-2019129520 A1 | | 7/2019 |

OTHER PUBLICATIONS

Datawalk: "Datawalk—Law Enforcement Demo: AML", Sep. 25, 2017; Available at https://www.youtube.com/watch?v=w8NCUSm2P40; Accessed on Sep. 2, 2019.
(Continued)

*Primary Examiner* — Augustine K. Obisesan
(74) *Attorney, Agent, or Firm* — Wilson Sonsini Goodrich & Rosati

(57) ABSTRACT

The present disclosure provides a computer-implemented method for scoring and visualizing combined search results, comprising: (a) performing a plurality of individual searches on data objects stored in a database, wherein the data objects are stored in defined fixed data structures; (b) combining the plurality of individual searches into a combined search; (c) determining a weight for each of the individual searches; and (d) obtaining a search result of the combined search, wherein the search result of the combined search comprises scores associated with a subset of the data objects.

20 Claims, 13 Drawing Sheets

(56) References Cited

U.S. PATENT DOCUMENTS

| | | | |
|---|---|---|---|
| 8,095,419 B1* | 1/2012 | Kapur | G06Q 30/0218 |
| | | | 705/14.2 |
| 8,631,001 B2 | 1/2014 | Lawrence et al. | |
| 9,747,312 B2 | 8/2017 | Piecko | |
| 10,002,143 B2 | 6/2018 | Piecko | |
| 10,095,743 B2 | 10/2018 | Piecko | |
| 10,242,056 B2 | 3/2019 | Piecko | |
| 2003/0131021 A1* | 7/2003 | Wight | G06Q 30/0601 |
| 2004/0064447 A1* | 4/2004 | Simske | G06F 16/3344 |
| | | | 707/999.005 |
| 2004/0193585 A1* | 9/2004 | Tago | G06F 16/24542 |
| 2009/0070297 A1* | 3/2009 | Hadzima, Jr. | G06F 16/951 |
| 2010/0094862 A1* | 4/2010 | Bent | G06F 16/2471 |
| | | | 707/E17.014 |
| 2012/0226687 A1* | 9/2012 | Xu | G06F 16/3338 |
| | | | 707/723 |
| 2013/0054569 A1 | 2/2013 | Mo et al. | |
| 2014/0012882 A1* | 1/2014 | Poppitz | G06F 16/2456 |
| | | | 707/E17.055 |
| 2014/0136517 A1* | 5/2014 | Li | G06F 16/345 |
| | | | 707/722 |
| 2014/0297693 A1* | 10/2014 | Piecko | G06F 16/213 |
| | | | 707/803 |
| 2015/0161240 A1 | 6/2015 | Rebbapragada et al. | |
| 2015/0347501 A1 | 12/2015 | Goshen | |
| 2017/0076897 A1* | 3/2017 | Kalous | H01H 71/0264 |
| 2017/0102863 A1* | 4/2017 | Elliot | G06F 3/04817 |
| 2017/0147585 A1 | 5/2017 | Kleindienst et al. | |
| 2017/0228430 A1* | 8/2017 | Li | G06F 16/24545 |
| 2017/0263242 A1* | 9/2017 | Nagao | G10L 15/144 |
| 2017/0308552 A1* | 10/2017 | Soni | G06F 16/58 |
| 2017/0308573 A1* | 10/2017 | Brisebois | G06F 16/24535 |
| 2018/0107740 A1* | 4/2018 | Galatzer | G06F 8/60 |
| 2019/0318644 A1* | 10/2019 | Aleem | G09B 7/00 |

OTHER PUBLICATIONS

PCT/EP2018/085190 Search Report & Written Opinion dated Feb. 28, 2019.

Exam Report issued in European Patent Application No. 18826274.5 dated Jan. 26, 2022.

* cited by examiner

| score | | names | | id | | scoring_date |
|---|---|---|---|---|---|---|
| 3.00 | | Min 1 SAR; | | 3,881,646 | | Sep-24-2017 |
| 3.00 | | Min 1 SAR; | | 3,881,657 | | Sep-24-2017 |
| 3.00 | | Min 1 SAR; | | 3,881,661 | | Sep-24-2017 |
| 3.00 | | Min 1 SAR; | | 3,881,668 | | Sep-24-2017 |
| 3.00 | | Min 1 SAR; | | 3,881,690 | | Sep-24-2017 |
| 3.00 | | Min 1 SAR; | | 3,881,698 | | Sep-24-2017 |
| 3.00 | | Min 1 SAR; | | 3,881,739 | | Sep-24-2017 |
| 3.00 | | Min 1 SAR; | | 3,881,772 | | Sep-24-2017 |
| 3.00 | | Min 1 SAR; | | 3,881,796 | | Sep-24-2017 |
| 3.00 | | Min 1 SAR; | | 3,881,812 | | Sep-24-2017 |

1 to 50 of 7,018

First | Previous | Page 1 of 141

FIG. 10

SYSTEMS AND METHODS FOR COMBINING DATA ANALYSES

CROSS-REFERENCE

This application is a Continuation Application of International Patent Application No. PCT/EP2018/085190, filed Dec. 17, 2018, which claims priority to U.S. Provisional Patent Application No. 62/611,033, filed Dec. 28, 2017, each of which is entirely incorporated herein by reference.

BACKGROUND

A database is a data storage concept that has evolved for decades since the 1960s to address increasing difficulties in designing, building, and maintaining complex information systems (e.g., multi-user systems with a large amount of data). Another data storage concept directly related to the database is a database management system (DBMS), which enables the effective handling of databases. Although the terms, database and DBMS, define different entities, they may be inseparable; for example, the properties of a database may be determined by a supporting DBMS of the database. A DBMS may be a complex software system, such as a general-purpose DBMS (e.g., Oracle®, Microsoft® Structured Query Language (SQL) Server®).

In particular, three major DBMS approaches that are widely used in the industry to create and manage a database are relational databases, object databases, and graph databases.

A relational database can be a collection of data items organized as a set of formally described tables from which data can be accessed easily. A relational database may be created using the relational model. The software used in a relational database may be referred to as a relational database management system (RDBMS). An RDBMS may comprise a number of tables in which, for example, each table has its own primary key.

A problem with the relational database may be the complexity that arises when the relational database is created. It is generally important that defined relationships among the tables are correct and that each set of information is linked to its pair. Although less information has to be entered in total than with other database approaches, verifying that the points are set up correctly may be a time-consuming process. Furthermore, the relationships between the tables can become complicated when a relational database comprises numerous tables.

An object database (also referred to as object-oriented database management system or OODBMS) can be a database management system comprising information represented in the form of objects, such as the objects used in object-oriented programming. Object databases may be different from relational databases. In some instances, a broader database management system may comprise both object databases and relational databases.

An object database may store complex data and relationships between data directly, for example, without mapping to relational rows and columns, which may make object databases suitable for applications in which complex data may be encountered. Objects may have a many-to-many relationship and may be accessed by the use of pointers. Pointers may be linked to objects to establish relationships. Another benefit of an OODBMS may be that an OODBMS may be programmed with small procedural differences without affecting the entire system. This may be helpful for those organizations that use data relationships that are not entirely final or where there is a need to change these relationships to satisfy a new business requirement.

Disadvantages of object databases may include, for example, lower efficiency when data is complex and/or relationships are complex, that late binding may slow down access speed, data and operations being separated, low responsiveness to changes in problem space, and inadequate design for concurrent problems.

A hybrid object-relational database may be suitable for some applications. A client application may direct queries to an object server component to obtain data from data sources. An object server component may operate with an object definition component which may fulfill the queries. An object definition component may access an object definition database to obtain and use metadata, in the form of programmatic objects, about the location and structure of the data stored in the data sources. In some cases, an object manager component may, for example, work with the object definition component to edit and create new metadata or, via the object server component, create new instances of the data sources.

Graph databases may depart from traditional storage and definitions paradigms. Many software developers may be familiar with storing data in tabular form in a relational database. Such approaches may work well for some applications, but not for others. Relational databases, for example, may exhibit difficulties in scaling. Given that more and more of today's innovative applications may involve massive data processing, such large data processing requirements may expose a need for new approaches, such as graph databases. For example, tables (e.g., tables used in relational databases) may be difficult to implement in web-based environments. Since a web may be characterized more as a collection of pages that are hyperlinked, than identically-shaped rows in a gigantic table, a graph database may more closely align with present-day web architectures. In some cases, a graph, as known from mathematics, or as informally drawn or used by most engineers, may be a much more natural representation for data that is native to the web. Given that much of the data processed by today's innovative applications may exist elsewhere or in remote locations, and given that some applications may not own a substantial percentage of their own data, such as for some social feed aggregators, graph databases may be more suited than some other database models.

Current databases, such as ORACLE®, may provide for the use of an ALTER command. The process of modifying database structures may directly require locking a database structure that will be modified. There is also a related LOCK command that effectuates a freeze of a database structure for the time of modification, such as adding, searching for, or modifying records of a given table. Some end-user database systems may make use of special scripts utilizing special triggers that may execute ALTER and/or LOCK commands automatically.

In some instances, an operation of adding a column to a database may lock a table. Further, an ALTER command may stop currently executing data processing tasks, such as transactions. This may render processing operations executing with varying number of parameters ineffective, and may potentially threaten the integrity of data gathering. Further, if data are collected very quickly, the size of a data buffer may be insufficient.

The use of the aforementioned commands in databases that are updated frequently may be problematic because such approaches may require the databases to stop certain services during each modification process. It may be beneficial to create a database system that does not require the stopping of one or more services when, for example, a new column is to be added to an existing table.

Drawbacks of known graph databases may include, for example, increased memory requirements and difficulties in presenting information to a user in a clear way. In some cases, where a few nodes have a large number of connections and most other nodes have fewer connections, graph databases may be designed to keep the nodes and their linked objects (references) as close as possible (e.g., in proximity); as a result, the graph databases may not be split, leading to inefficient data drilling. Further drawbacks of current database systems include the unavailability of extending databases in real time and difficulties in understanding how a complex database is designed.

At least for the disadvantages and fallbacks of the present techniques that have been described, there is a need to design and implement an efficient database model that is especially adapted to large scale databases, is easily scalable, and has reduced memory requirements in comparison to graph, relational or object-oriented databases.

Moreover, data analysis may be performed for effective decision making such as business decision or security decision. For instance, the increase in computer related crimes, with particular reference to internet crimes, has led to an increasing demand for state-of-the-art digital forensics. Forensic analysis is a term for in-depth analysis, investigation whose purpose is to objectively identify and document the culprits, reasons, course and consequences of a security incident or violation of state laws or rules of the organization. Machine learning methodologies have been employed for forensic analysis by such as by tracing past file system activities and identifying incriminating evidence. Oftentimes, such methodologies are limited by the training datasets and become more complicated if some information is missing or certain sources of evidence are contaminated or scrubbed. Additionally, machine learning methodologies may not be efficiently adapted for fast changing data.

SUMMARY

Recognized herein are various limitations to databases and data analysis methods that are currently available, such as those described above. It may be advantageous to improve data analysis and decision making processes with a flexible data analysis and data visualization tool. Such a tool may be independent of a hierarchy of a database. For example, up to now, such data analysis processes and/or data query processes may have been hardcoded in end-user software, such as Business Intelligence (BI) database software, Enterprise Resource Planning (ERP) database software, and Customer Relationship Management (CRM) database software.

In a traditional SQL-based system, a user seeking an answer may proceed through a series of queries. At each step, the query may become longer and more complex, and take longer to execute. With each incremental step, the assumptions in the query may become increasingly hidden (e.g., concealed) from the end user. Each step may require a SQL expert with knowledge of the underlying data representation. The focus with such systems may be concentrated on writing good queries. NoSQL databases or other well-known database languages may also share such problems with SQL-based systems.

Methods and systems of the present disclosure may allow a user to explore, mine, and/or analyze data objects by building search paths or creating analyses. An analysis may correspond to a search path. An analysis may comprise multiple queries or operations. In particular, methods and systems of the present disclosure may allow a user to combine multiple analyses into an integrated analysis. The integrated analysis may allow a user to explore data objects and identify high-level patterns by applying user-adjustable weights on the underlying individual analyses. This provides benefit and advantage to a user for making decisions with reduced variables and provides flexibility to a user for changing focus on specific factors of an integrated analysis. The provided methods and systems can be applied to forensic analysis and various other applications to achieve an improved performance in a decision making process, such as in efficiency and required level of sophistication.

A user may not need to be aware of the SQL queries (or NoSQL queries) which are being generated behind the scenes. For example, a user may not need to be aware of the SQL queries when combining multiples analyses. The systems may provide a user interface to a user, and the user interface may direct the user along a path of inquiry. Each step can be incremental and fast. As a user creates a path, all of the previous steps may be visible to the user, and the assumptions may not be buried in, for example, an exceedingly long SQL query. If a path leads to a dead-end, a user may quickly and easily return to a previous step in the path and resume exploration from that point.

In some cases, the systems may provide switchable user interfaces. At least one of the available interfaces may be configured to assign weights to multiple individual analyses for combining the individual analyses to generate an integrated analysis. In some instances, at least one of the available interfaces may be configured for visualizing a database. In some instances, the system may further provide an interface for visualizing an analysis result or search result of a combined analysis or any other analyses performed in the database.

Systems of the present disclosure may be connection-oriented. An underlying relational database management system (RDBMS) may be optimized around connections (as opposed to objects). For example, when the RDBMS partitions data for performance, there is no need for an object to reside wholly within a single partition. In the disclosed system, the connections may be spread across all available compute resources. Consequently, even massively linked objects may be handled without the performance penalty issues in a traditional graph database.

In an aspect, a computer-implemented method for scoring combined search results is provided. The method comprises: (a) performing a plurality of individual searches on data objects stored in a relational database to generate an individual search result for each of the plurality of individual searches, wherein the data objects are stored in defined fixed data structures in the relational database, and wherein each individual search result comprises a given subset of the data objects; (b) combining the plurality of individual search results to generate a combined search result, wherein the combined search result comprises a combined subset of the data objects; (c) determining and assigning a weight value for each of the plurality of individual searches; and (d) presenting the combined search result to a user on a graphical user interface, wherein the combined search result comprises scores associated with the combined subset of the data objects, wherein a score associated with a data object from the combined subset of the data objects is determined based at least in part on the weight value assigned to a given individual search result.

In some embodiments, the scores associated with the combined subset of the data objects are stored in the relational database in the defined fixed data structures. In some cases, at least one of the defined fixed data structures is configured to store definitions of properties of the scores, and the properties of the scores comprise at least a scoring value, a timestamp, and indication of contribution of an individual search. In some instances, the method further comprises sorting the search results by one or more of the properties.

In some embodiments, the weight value is determined in response to input from the user or automatically determined based on historical data. In some cases, the weight value is determined using an algorithm trained on the historical data. In some cases, the weight value is determined without user input.

In some embodiments, the combined search result further comprises a timestamp associated with each of the scores and one or more of individual searches contributing to each score. In some cases, the scores are presented in a histogram on the graphical user interface. In some instances, the histogram comprises a plurality of buckets pre-determined by the user. In some cases, the method further comprises sorting the combined search result according to the respective values of the scores or the respective timestamps of the scores.

In some embodiments, the defined fixed data structures used to store data objects comprise: a first data structure, stored in a memory, comprising a definition of data sets in the relational database, wherein a definition of a data set comprises a unique data set identifier and a set name; a second data structure, stored in the memory, comprising definitions of properties of objects in the relational database, wherein a definition of a property comprises a unique identifier of the property and a data set identifier, from the first data structure, the property is assigned to; a third data structure, stored in the memory, comprising definitions of objects of the data sets in the relational database, wherein a definition of an object comprises a unique object identifier and a data set identifier, from the first data structure, the object is assigned to; a fourth data structure, stored in the memory, comprising definitions of object values of the data sets in the relational database, wherein a definition of object value comprises an object identifier, from the third data structure, and a property of the data set, from the second data structure, the object value being assigned to; a fifth data structure, stored in the memory, comprising definitions of relations of data sets in the relational database, wherein a definition of a relation comprises a unique identifier of the relation and a name of the relation; and a sixth data structure, stored in the memory, comprising definitions of objects relations between the objects in the relational database, wherein a definition of an object relation associates a relation, from the fifth data structure, with two object identifiers from the third data structure. In some cases, the defined fixed data structures further comprise a seventh data structure, stored in the memory, comprising definitions of set relations between data sets in the relational database, wherein a definition of a set relation associates a relation, form the fifth data structure, with two set identifiers from the first data structure.

In another aspect, a system for scoring combined search results is provided. The system comprises: a relational database that stores data objects in a non-hierarchical manner; and one or more computer processors operatively coupled to the relational database, wherein the one or more computer processors are individually or collectively programmed to: (i) perform a plurality of individual searches on the data objects, wherein each individual search result comprises a given subset of the data objects; (ii) combine the plurality of individual search results to generate a combined search result, wherein the combined search result comprises a combined subset of the data objects; (iii) determine and assign a weight value for each of the plurality of individual searches; and (iv) present the combined search result to a user on a graphical user interface, wherein the combined search result comprises scores associated with the combined subset of the data objects, wherein a score associated with a data object from the combined subset of the data objects is determined based at least in part on the weight value assigned to a given individual search result.

In some embodiments, the scores associated with the combined subset of the data objects is stored in the relational database in the non-hierarchical manner. In some embodiments, the weight value is automatically determined based on historical data.

In some embodiments, the combined search result further comprises a timestamp associated with each of the scores and one or more of individual searches contributing to each score. In some cases, the one or more processors are programmed to further sort the combined search result according to the respective values of the scores or the respective timestamps of the scores.

In some embodiments, the scores are presented in a histogram on the graphical user interface. In some cases, the histogram comprises a plurality of buckets pre-determined by the user.

Additional aspects and advantages of the present disclosure will become readily apparent to those skilled in this art from the following detailed description, wherein only illustrative embodiments of the present disclosure are shown and described. As will be realized, the present disclosure is capable of other and different embodiments, and its several details are capable of modifications in various obvious respects, all without departing from the disclosure. Accordingly, the drawings and description are to be regarded as illustrative in nature, and not as restrictive.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings (also "FIG." and "FIGS." herein).

FIG. 6 shows an example of a scoring interface.

FIG. 8 shows an example of assigning weights to selected analyses via a scoring interface.

FIG. 10 shows an example of presenting and analyzing a combined analysis result in table format.

DETAILED DESCRIPTION

Figure 1:
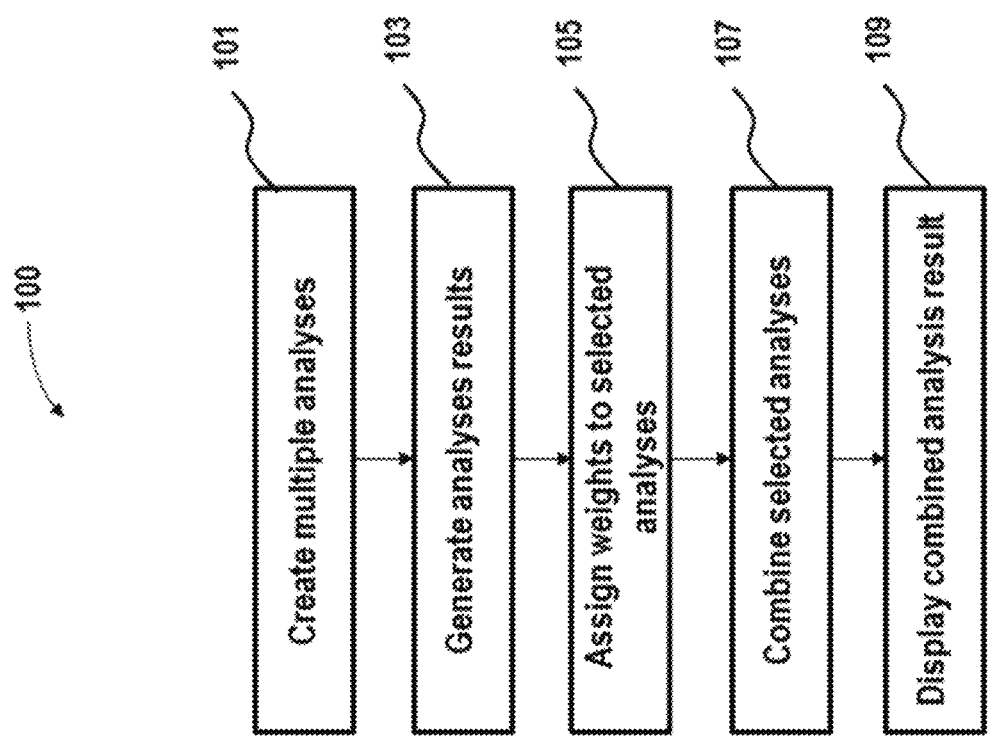
FIG. 1 schematically shows an exemplary process of combining multiple analyses.

While various embodiments of the invention have been shown and described herein, it will be obvious to those skilled in the art that such embodiments are provided by way of example only. Numerous variations, changes, and substitutions may occur to those skilled in the art without departing from the invention. It should be understood that various alternatives to the embodiments of the invention described herein may be employed.

Systems and methods of the present disclosure may be visualization-oriented, which may enable a user to explore integrated search results, make decisions, or combine individual analyses by selecting graphical elements, such as to enter or adjust weights assigned to each individual analysis. A plurality of individual analyses, or results thereof, may be combined to generate a combined analysis, or results thereof. In some cases, the combined analysis or analysis result may be dynamically updated upon a change of an underlying individual analysis, such as change of a query of an analysis (e.g., query operation or parameter in an query) or change of a data object (e.g., adding, removing an object, change of a value of an object). The combined analysis or analysis result may be dynamically updated in response to a change of a weight assigned to an analysis. In some cases, the visualization system may provide a user interface allowing a user to visualize the combined analysis result. A user may further adjust the weight or manipulate selection of the analyses by viewing the visualized analysis result. In some cases, the analysis result may comprise a score calculated based on the weight assigned to each analysis. In particular, the weight may be assigned to the data objects in a result dataset of a selected analysis. This fast computation of the combined analysis result may be enabled by storing a series of operations (e.g., search path or analysis) and/or storing a data object using a set of predefined data structures.

Systems and methods of the present disclosure may generate a series of visible queries, enabling the system to be effectively operated by a user who has no knowledge of SQL or any specific database systems or languages. The visualization system may provide a user interface to a user, and the user interface may allow the user to explore a search path. Each step of the search path can be incremental from the previous step. Each step may generate fast results. As a user creates a search path, all or at least a portion of the previous steps of the search path may be visible to the user. The operation and/or filtering criteria associated with each step may be visible. If a path leads to a dead-end, a user may return to a previous step in the path and resume exploration from that point.

Analysis

The present disclosure provides methods and systems for providing an analysis process by creating a search path from a first set of objects to a second set of objects. In some embodiments, search paths may be paths provided to users on a user interface, such as a graphical user interface (GUI).

An analysis may correspond to a search path. In some cases, an analysis may comprise a search path and additional information about the analysis. Such additional information may include a name and description of the analysis and/or a name and description of a component of the search path. A search path may comprise a sequence of high level queries and/or operations on at least a subset of objects in a database. A search path may also be referred to as a "breadcrumb." The search path may be generated and/or updated automatically when a user traverses one or more data objects in the database. The search path may be generated and/or updated automatically as the user performs operations on the data objects to investigate or explore the data. In some instances, the search path may be generated and/or updated in real-time.

Real-time can include a response time of less than 1 second, tenths of a second, hundredths of a second, or a millisecond. In some instances, real-time can refer to a simultaneous or substantially simultaneous timing of one process (e.g., visualization of search path) relative to another process (e.g., user exploration of data). All of the visualize processes described herein may be capable of happening in real-time.

The search path may comprise one or more high level queries and/or operations. The one or more high level queries and/or operations may be performed by a user. In some embodiments, a high level query on the objects in the database may be translated into a set of predefined queries such as relational database management system (RDBMS) structured query language (SQL) queries. In some cases, the set of predefined queries may not be visible to a user. The set of predefined queries may be a set of optimized queries generated by the provided system upon receiving a high level query request from a user. The set of predefined queries may be optimized to improve query performance. For example, the set of predefined queries may be generated using horizontal and vertical partitioning strategies or server clustering techniques.

In some cases, a predefined query may be stored as a template query and comprise values of filtering criteria associated with the underlying objects. For instance, one template query can be used to retrieve an object and all of its properties, and another template query can be used to retrieve a list of objects that share a particular connection regardless of the underlying objects. These template queries can be used repetitively and applied to various different types of data objects.

The high level query may comprise filter operations on a set of objects, data objects, and/or connections between datasets. For example, a user may filter on a property of a selected data object, filter on the number of selected relationships between selected data sets, and/or filter on the type of connection between selected data sets.

In some embodiments, an operation can be any operation performed on objects in the database. The operation may be a filter or query operation performed on the data objects, as described above. The operation may be an analysis of a search result, such as a complementary operation of a previous filter operation that provides complementary search results of the previous filter operation. The operation may be a selection operation of a subset of sorted search results.

A search path may comprise a plurality of steps, or points. A step, or point, in a search path may be associated with an operation, as described elsewhere herein. The steps in a search path may be sequential. A subsequent step to a previous step may be cumulative, and incremental to the previous step. Visualization of the search path may comprise visualization of the sequence of the steps in the search path. A user may freely navigate from point to point in a generated search path.

One or more search paths, or operations of a search path, can be saved as a user explores connections between data sets and/or performs data analysis. The search path may represent an investigation path of a user who creates and answers questions as the user explores the data. When creating a search path, a user may select a starting data set, view the available connections from objects in the selected data set to other objects in a graphical user interface, and jump along one or more connections (i.e., perform a query on a connected data set via selecting one or more connections). Saving a series of operations or a full search path may allow a user to return to any point in the search path at a later time for further exploration. In some instances, a search path or a series of operations of a search path (i.e., partial search path) may be saved along with the respective search result that the search path reached. In some cases, the search result or intermediate search result may be saved in isolation. For example, the search path taken to reach the particular isolated search result may not be saved. This may be of benefit, for example, if the search path is particularly long or convoluted and saving the path provides little value to the user. Alternatively, the search result or intermediate search result may be saved together with the search path taken to reach the search result. In some embodiments, the system may provide an option for the user to choose whether a search result should be saved with or without the associated search path.

Systems and methods may be provided for combining multiple analyses. In some embodiments, a user may combine multiple weighted analyses, or results thereof, to obtain an integrated or combined analysis, or results thereof. In some cases, an integrated analysis result may comprise a score computed for each data object in the result dataset. A score of a data object may be computed based on a weight assigned to each analysis. In some cases, a score may be computed as a sum of weights assigned to the data objects in the result datasets of the analyses. Alternatively, other methodical or computational functions (e.g., multiplication, linear or non-linear, average, mean, median, score of a specific percentile, etc.) may be used to determine a score as a function of the multiple analyses.

In some embodiments, scores may be stored in the database using the predefined data structures as described elsewhere herein. For instance, scores may be stored by creating an entity class and one or more entity class attributes associated with scores. The entity class attributes may comprise a score value and/or metadata such as a timestamp associated with performing the analysis or generating the score. For example, scores may be stored by creating a new entity class named "score" with an entity class attribute named "score value" for storing score values and an entity class attribute named "timestamp" for storing timestamp metadata. In some cases, the score entity class may further store other information such as relations to an analysis result data set and other information that may link the score to a data object in the result dataset. This may allow for tracking scores associated with a single data object along with time.

FIG. 1 schematically shows an exemplary process 100 of combining multiple analyses, in accordance with embodiments of the invention. In some embodiments, multiple analyses may be combined to provide a scoring result. Each analysis may be assigned a weight for calculating the score. A weight may be a numerical value that can be in any format. For example, a weight can be integer in any range (e.g., negative or positive), floating point value with any suitable precision and the like. A weight can be in the form of discrete numbers, continuous, percentage, or various other formats. In some cases, the multiple analyses may be weighted and normalized. For instance, a normalization factor may be applied to each analysis resulting in a normalized score of the combined analysis. Alternatively, the weights assigned to the analyses may not be normalized.

The value of weight may be assigned to an analysis based on any logic. For example, a greater value may indicate a preference for or a greater impact of an analysis in the combined result. Such preference, for example, may be based on a preference for a search query or filtering operation of the analysis and/or a preference for the results obtained. In another example, a weight value of zero may be assigned to a non-selected analysis.

The value of weight may be set or assigned manually or in an automated fashion. In some embodiments, a user may input a value or a weight for a selected analysis. For instance, the system may provide a user interface allowing a user to input a weight or change a weight. A user may be allowed to input a value as a weight in any range or format. Alternatively or additionally, a user may input a value in a confined range. In some embodiments, weights assigned to the analyses may be generated automatically according to an algorithm. The algorithm may, for example, determine a value of a weight as a function of one or more factors. The one or more factors may relate to, for example, number of analyses, historical analysis result, user-defined rules or preferences. In some cases, the weight value may be determined using a machine learning algorithm trained on historical data. Artificial intelligence, such as machine learning algorithms, may be used to train a model for generating a weight value. A machine learning algorithm may be a neural network, for example. Examples of neural networks include a deep neural network, convolutional neural network (CNN), and recurrent neural network (RNN). The machine learning algorithm may comprise one or more of the following: a support vector machine (SVM), a naïve Bayes classification, a linear regression, a quantile regression, a logistic regression, a random forest, a neural network, CNN, RNN, a gradient-boosted classifier or repressor, or another supervised or unsupervised machine learning algorithm. In an example, a weight may be determined or set based on a previous value set by a user. In another example, a weight value for each analysis may equate to 1/n for n number of analyses. In another example, a weight may be determined or set based on a previous analysis result or a change of previous analysis result. In another example, a weight may be determined or set based on a user-defined normalization rule or user preference indicating a user interested investigation direction. In some cases, a weight may be determined or set by a combination of manual input and auto-generated value. For instance, a weight may be first generated automatically then modified or adjusted by a user manually. An automatically generated weight value may or may not be overridden by a user-provided weight value.

A score may be computed for the combined analysis. As described above, a score may be computed for each data object in the result dataset of the combined analysis. A score may be calculated based on the weights assigned to the analyses or assigned to the data objects in the result dataset of the analysis respectively. In some embodiments, a score associated with a data object in the result dataset of the combined analysis may be computed as a weighted sum of the counts of the data object showing in the multiple analyses results. For instance, the counts of a data object may be computed by identifying the entity ID or any other primary key uniquely associated with the data object. This provides benefits to provide a score regardless of the datatype of data structure of the entity/data object. For example, an entity that is in the result of an analysis gets a weight whereas an entity that is not in the result of an analysis gets a weight zero. Accordingly, a score may be computed as: weight of an analysis 1+weight of an analysis 2+ . . . +weight of an analysis N A score value may or may not have the same format as the weight value. In some cases, a score computed for a data object may be tracked along with time. This may be achieved by recording the score and a relation or link between the score and the associated data object. Providing a tracked history of scores of a data object may provide an additional dimension (i.e. time) for consideration in a decision making process. For example, a user may view a trend or change of the score of a given data object over a selected period of time. In some embodiments, the result dataset of a combined analysis may be stored in a table. In some cases, the link between the data object and the score is stored in the table. For example, an entry of the table may comprise at least a score and an entity ID (e.g., data object ID) of the data object for which the score is calculated. In some cases, the table may comprise other data (e.g., metadata) such as a timestamp associated with the score and/or analyses contributing to the score.

Referring to the process 100, multiple analyses may be created 101. In some cases, the multiple analyses may comprise at least a subset of analyses sharing a target set. A target set may also be referred to as a main set. The target set or main set may be or may be not the data set that a search path begins with. The target set or main set may also be the main set of the combined analysis. Creating an analysis may correspond to generating a search path. A search path comprises a series of queries and/or operations. A search path may be generated when a user performs a series of queries on data objects or a subset of objects in the database. A search path may be generated via a graphical user interface. For example, a breadcrumb may be generated that comprise a series of graphical elements corresponding to the series of operations. As mentioned above, an analysis may comprise a search path. This analysis process may proceed over as many data set queries as the user wishes to investigate. The series of queries and/or operations may be applied to data objects of the same entity class or different entity classes. The series of queries and/or operations may also comprise filter operations on connections between entity classes and/or analysis of a search result, as described elsewhere herein. In some cases, the provided system may allow a user to backtrack and create a new analysis or search path starting from any previous query or operation.

A user may trace back to any prior point in a search path and create a different search path therefrom. This may be enabled by the provided system that is configured to retain (e.g., store in memory) the intermediate results of previous query executions in temporary tables, use a set of predefined query templates, utilize saved search paths or series of operations, and store objects using a set of logical data structures.

In some embodiments, an analysis may be performed to generate a result dataset 103. In some cases, the results of each step in the search path may be stored in a temporary table. In an example, as the user performs queries in a search path, the system may be configured to execute a set of predefined queries against the underlying RDBMS, as described elsewhere herein. The result of the query may be a list of identifier IDs of the objects. The result may then be kept as one or more temporary tables in the database. When the user continues to explore the objects, such as by jumping along another connection, the same set of predefined queries or query templates may be executed again, and the temporary table(s) of the previous query may be used as a source table of the next query.

In another example, storing intermediate results along the search path in temporary tables may allow a user to explore unknown connections. For instance, at any point in investigating data objects and developing a search path, a user may try out various queries to explore what other objects are connected to the search path or other search directions at this point. In this case, the user may repetitively return back to the same point or any previous point for exploring possible or unknown relationship between objects. Such operations may not be supported by conventional SQL based data representations in which a user may only be allowed to access the final result of a SQL query.

Additionally, storing the results of each step along the search path may be beneficial for sharing the search results among different users or different projects, thereby speeding up an analysis. For instance, before a user begins exploring a new search path, the system may examine existing temporary results tables and the related search paths to see if any of them cover the new search path or at least the beginning of the new search path. If a matching temporary results table and/or search path is found, then the temporary results and/or search path may be used directly without having to execute the operations again, thereby reducing time for analysis and saving substantial processing. Shared and repetitive use of intermediate results among different users and/or projects may allow the system to perform analysis with faster response time.

The multiple analyses and the respective result dataset may be stored. Next, weights may be assigned to selected analyses 105. Multiple analyses may be selected to be combined into one analysis. A weight may be assigned to a result dataset of a selected analysis. For instance, data objects in a result dataset may be assigned a weight. Different result datasets of different analyses may or may not be assigned different weights. In some cases, a user may select one or more analyses from the multiple analyses to combine. A user may set a weight for each of the selected analyses as described elsewhere herein. Alternatively, a weight may be automatically generated for a selected analysis.

Next, the multiple selected analyses may be combined 107 to obtain a combined analysis result. In some cases, multiple results datasets of the multiple selected analyses may be merged into a result dataset along with a score computed for each data object in the result dataset. For instance, a UNION operation may be applied to the multiple result datasets to merge the result datasets into a combined analysis result. A score may be generated based on the weights assigned to the selected analyses. The score may be stored in the database using the predefined or fixed data structures as described later herein.

The combined analysis result may then be transmitted to a user interface for display 109. In some cases, a user may be presented scores associated with data objects in the result dataset. The scores may be presented in one or more visual formats. In some instances, the data objects may be sorted and presented in the order of increasing or decreasing scores associated with the respective data objects. In some embodiments, a result interface may provide one or more visual or graphical representations for a user to view and further analyze the combined analysis result. The visual or graphical representations may include, but are not limited to, tables, bar charts, pie charts, histograms, line charts, textual representations (e.g., numbers, text), multimedia representations (e.g., audio and/or video clips), and the like. A user may be allowed to edit the one or more visual or graphical representations via the result interface. For instance, a user may select to view the search result ranked according to the score and/or view the data objects in a user selected score range. A user may switch between different visual or graphical representations. In other embodiments, the user may be allowed to select between two different display styles. For instance, a user may switch the display style or display format from the histogram display to a tabular display.

The provided search path may permit exploring data objects and performing data analysis with improved performance. In some embodiments, the search path may be an interactive breadcrumb generated and provided to a user on a graphical user interface such that a user may modify and adjust one or more parameters or filter criteria by interacting with the breadcrumb directly. A breadcrumb may be interactive ("interactive breadcrumb"). A breadcrumb may comprise a search path. A breadcrumb may comprise one or more components of a search path.

In some embodiments, the breadcrumb may comprise a plurality of visual graphical elements on the user interface. The plurality of visual graphical elements may correspond to one or more queries and/or operations performed on at least a subset of objects in the database. In some embodiments, the one or more queries can be the same as the high level queries described elsewhere herein. The high level query may comprise filter operations on a set of objects, data objects, and/or connections between data sets. For example, a user may filter on a property of a selected data object, filter on the number of selected relationships between selected data sets, or filter on the type of connection between selected data sets. The one or more operations can be the same as the operations described elsewhere herein. The one or more operations may comprise filter operations and various other operations for further analyzing a search result. For example, a complementary operation may be applied to a previous filter operation that provides complementary search results of the previous filter operation. In another example, an operation of selecting a subset of sorted search results may be performed.

In some cases, a graphical element may correspond to a query on a set of objects. Each query may comprise one or more filter operations. In some cases, a graphical element may comprise a graphical representation of options for determining a logical relationship (e.g., AND, OR, XOR, etc) of multiple filtering operations. In some cases, a graphical element may correspond to an operation for a further analysis step or presenting step of a search result. A graphical element may correspond to a step in the search path. A step in a search path may be a query operation performed on at least a subset of objects in the database, a filter operation on connections between data sets, a selection of a data set, an analysis step on a search result, and/or various other operations. A step may correspond to one operation. A step may correspond to a plurality of operations.

In some embodiments, a graphical element may comprise icons or images indicative of a type of operation of the associated step. By way of example, a target icon may indicate that a target data set is selected, a funnel icon may indicate a filter operation on the selected data set, an arrow icon may indicate an operation of filtering by number of connections, and an arrow-over-funnel icon may indicate a filter operation by types of connections between selected data sets. It is not intended that the invention be limited by the specific examples provided within the specification, and various other images or icons (e.g., static images or dynamic images) can be used. The graphical element may be any graphical representation (e.g., an image, an icon, a video, a barcode, an optical signal, a graphic, etc.).

The interactive breadcrumb may allow a user to visualize any step, query, operation, intermediate search result, and/or filter criteria along the search path. In some embodiments, at least one of the operations can be modified or defined via the interactive breadcrumb directly. For instance, the logical relationship of multiple filtering operations may be specified by a user by directly selecting an operation (e.g., AND, OR, XOR, etc) presented by the graphical elements of the search path. The breadcrumb may be presented to a user in any location on a display screen. For instance, the breadcrumb may be displayed on top of a graphical database view, a bottom bar, a left column, a right column, or in any other position. In some cases, each "crumb" in the breadcrumb may correspond to a graphical element as described elsewhere herein. In some embodiments, each crumb may be selectable or editable by a user. In some cases, each crumb may correspond to a step in the search path. Alternatively, a crumb may correspond to multiple steps in a search path. In some cases, a combined analysis result may also be a component of a breadcrumb of a component of a search path.

As mentioned above, objects in the database may be organized and stored using a set of logical data structures. Such set of logical data structures may be based on a mind map. Storing objects in a database based on the mind map architecture allows a user to explore objects, and perform analysis by creating, modifying and storing one or more search paths with improved efficiency and flexibility.

Database Systems

A relational database of the present disclosure may be summarized as follows: there are at least two sets of elements and at least one relation that define how elements from a first set are related to elements of a second set. The relation may be defined in a data structure that maps elements of the first set to elements of the second set. Such mapping may be brought about with the aid of unique identifiers (within each set) of the elements in each set.

A relational database designer may find it challenging to describe real life events and entities on a very complex tables and relations diagram.

Real life events, however, may be suitably defined and presented with the aid of electronic mind maps (also referred to as "mind maps" herein).

In some embodiments, an electronic mind map is a diagram which may be used to visually outline and present information. A mind map may be created around a single object but may additionally be created around multiple objects. Objects may have associated ideas, words and concepts. In some instances, the major categories radiate from each node, and lesser categories are sub-branches of larger branches. Categories can represent words, ideas, tasks, or other items related to a central key word or idea.

Figure 2:
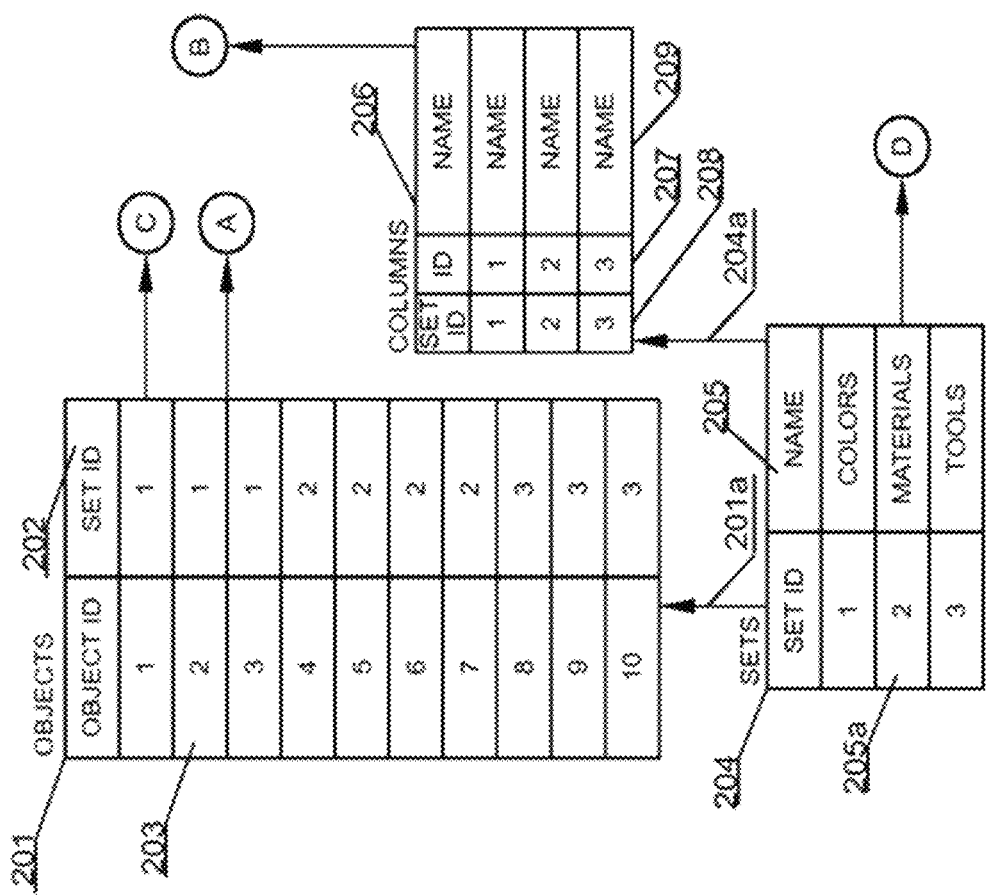
FIG. 2 shows a new database system.
Figure 3:
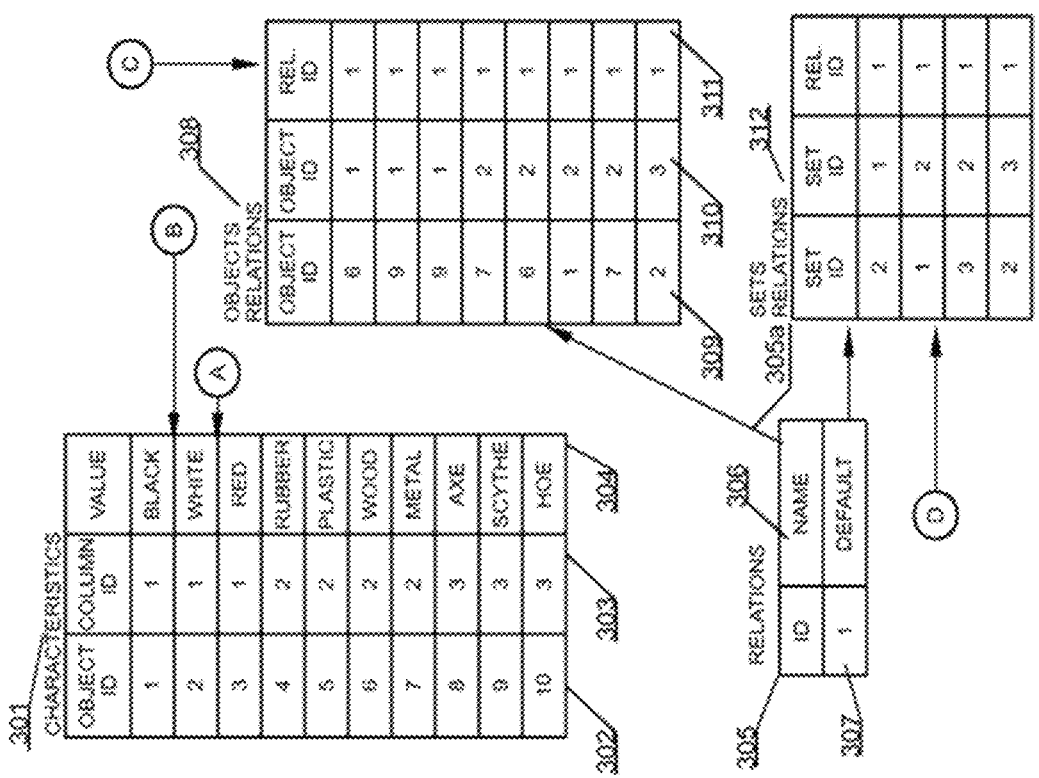
FIG. 3 shows an example of a database system of the present disclosure.

FIG. 2 and FIG. 3 show a new database system. In order to cooperate with mind maps, the database system has been designed differently than known database systems. The database system may comprise six core data structures and optional data structures. The core data structures may comprise SETS 204, OBJECTS 201, COLUMNS 206, CHARACTERISTICS 301, RELATIONS 305 and OBJECTS RELATIONS 308. It should be noted that the names above are exemplary only and the respective core sets are defined rather by their function within the system than their name.

The first data structure is called SETS 204 because it may be used to logically hold data related to sets of data. Sets of data may be represented on a mind map as nodes. Each entry in a SETS data structure 204 may comprise at least a unique identifier 205a of a data set and may also comprise a name 205 of the data set. The SETS data structure may be a top level structure and may not refer to other data structures, but other data structures may refer to the SETS data structure as identified by respective arrows between the data structures of FIG. 2.

Each set of data may be, as in the real world, characterized by one or more properties. The second data structure may be called COLUMNS 206. A property, typically referred to as a "column," may be uniquely identified with an identifier ID 207 and may be associated with a data set, defined in the SETS data structure 204, with the aid of an identifier herein called SET ID 208. A column may also be associated with a name 209. As indicated by an arrow 204a, the COLUMNS data structure may logically, directly reference the SETS data structure 204, because the COLUMNS data structure may utilize the identifiers of data sets. If, for example, each color of the data set called COLORS comprises another property, such as RGB value, an exemplary entry in the COLUMNS data structure may comprise the following values: '1, 4, RGB'. Referring back to an example from FIG. 2, there may be three columns wherein each column is associated with a textual identifier "NAME" 209.

Objects may form elements of respective data sets in the SETS 204 data structure and may have properties defined by the COLUMNS 206 data structure. Objects may be held in the OBJECTS 201 data structure. The OBJECTS 201 data structure may hold entries uniquely identified with an identifier ID 203 and associated with a set, defined in the SETS data structure 204, with the aid of an identifier herein called SET ID 202. As indicated by an arrow 201a, the OBJECTS data structure may logically, directly reference the SETS data structure, as, for example, the SETS data structure utilizes identifiers of sets. Referring back to an example from FIG. 2, there are ten objects in the database, namely three colors, four materials, and three tools. Hence, the OBJECTS data structure 201 may comprise ten objects.

A fourth core data structure, identified as CHARACTERISTICS 301 in FIG. 3, may hold data entries of each property of each object in FIG. 3. This data structure may be a fundamental difference from known databases in which there are rows of data that comprise entries for all columns of a data table. In the present disclosure, each property of an object is stored as a separate entry, which may greatly improve scalability of the system and allow, for example, the addition of object properties in real time.

The CHARACTERISTICS 301 data structure may hold entries uniquely identified using an identifier OBJECT ID 302 and may be associated with a property, defined in the COLUMNS data structure 206, with the aid of an identifier herein referred to as COLUMNID 303. Further, each entry in the CHARACTERISTICS data structure may comprise a value of a given property of the particular object. As indicated by respective arrows originating from sources A and B, the CHARACTERISTICS data structure 301 may logically, directly reference the COLUMNS data structure and the OBJECTS data structure, because CHARACTERISTICS data structure 301 uses the identifiers from the respective data structures. CHARACTERISTICS data structure 301 includes a VALUE property 304, such as: black, white, red, rubber, plastic, wood, metal, axe, scythe, and hoc.

Referring to an example from FIG. 3, there are ten characteristics that may result from the premise that there are three colors, four materials and three tools. By way of a non-limiting example, one can easily recognize that the BLACK color refers to an object having ID of 1 and a property having ID of 1. By using these identifiers, for example, one may determine that the property description is "NAME" and that the object belongs to the set whose description is "COLORS".

A fifth core data structure, RELATIONS 305, may function as an operator to hold data regarding relations present in the database. This may be a simple structure and, in principle, may hold an identifier of a relation ID 307 and additionally hold a textual description of the relation i.e., a NAME 306. As indicated by an arrow 305a, the RELATIONS data structure may logically, directly reference (e.g., downwards direction) an OBJECTS RELATIONS data structure 308, because the OBJECTS RELATIONS may use the identifiers of the relations. While only one entry is illustrated in the RELATIONS data structure, there may be a plurality of types of relations. For example, a type of relation may be indicative of a direction (e.g., unidirectional, bidirectional, etc.) of a relation.

Referring back to mind maps, for example, a relation present in the RELATIONS 305 data structure, may directly map to a branch between two nodes of a mind map. In some embodiments, as in typical mind maps, a relation may be provided with a textual description.

A sixth core data structure may be the OBJECTS RELATIONS data structure 308. This data structure may be designed to provide mapping between a relation from the RELATIONS data structure 305 and two objects from the OBJECTS data structure 201. For example, a first entry in the OBJECTS RELATIONS data structure 308 defines that a relation having identifier of 1 exists between object having an identifier of 1 and an object having an identifier of 6. This may be an exact definition that a material of wood has a color of black, which is defined across the present relational database system. OBJECT RELATIONS data structure 308 includes Object ID columns 309, Object ID column 310, and Relation ID column 311.

In some embodiments, a seventh data structure may exist in a database system. This data structure may hold data regarding relations between respective data sets and in FIG. 3 may be referred to as SETS RELATIONS 312. This data structure may function or operate to provide mapping between a relation from the RELATIONS data structure 305 and two sets from the SETS data structure 204. For example, a first entry in the SETS RELATIONS data structure 312 may define that the relation having identifier of 1 may exist between a set having an identifier of 1 and a set having an identifier of 2. Providing an entry in the SETS RELATION data structure 312 between a set having an identifier of 1 and a set having an identifier of 2 as well as between a set having an identifier of 2 and a set having an identifier of 1, may allow for creating a bidirectional relation.

There is also a possibility of self-referencing from a given set. For example, such case may be present when there is a set of persons and there exists a student—teacher relation between persons assigned to a particular set. Self-referencing links can be also unidirectional which means that the Entities are bound only in one direction. One can fetch information about linked Entities but cannot refer back to source from the results.

As described, a relational database system of tables may, in one possible example implementation, be stored in the above-described six data structures. In some instances, most of the data may be kept in the OBJECTS and CHARACTERISTICS data structures.

The data structures that are illustrated and described in FIG. 2 and FIG. 3 may also be altered in various ways. For example, in FIG. 2, the OBJECTS data structure can be partitioned or sharded according to SET ID 202. Sharding, as used herein, may generally refer to horizontal partitioning, whereby rows of database tables may be held separately rather than splitting by columns. Each partition may form part of a "shard," wherein each "shard" may be located on a separate database server or physical location. Similarly, in FIG. 3, for example, the CHARACTERISTICS data structure can be partitioned or sharded according to COLUMN ID 303. When sharding is used, for every column in a set, the system may create key value tables that can comprise of the values from the chosen column. The OBJECT RELATIONS table can also be partitioned or sharded according to the REL. ID 311 or sharded according to an algorithm that can maintain persistence. FIGS. 2 and 3 are for illustration purposes only and may comprise of more columns than is illustrated in those figures.

Figure 4:
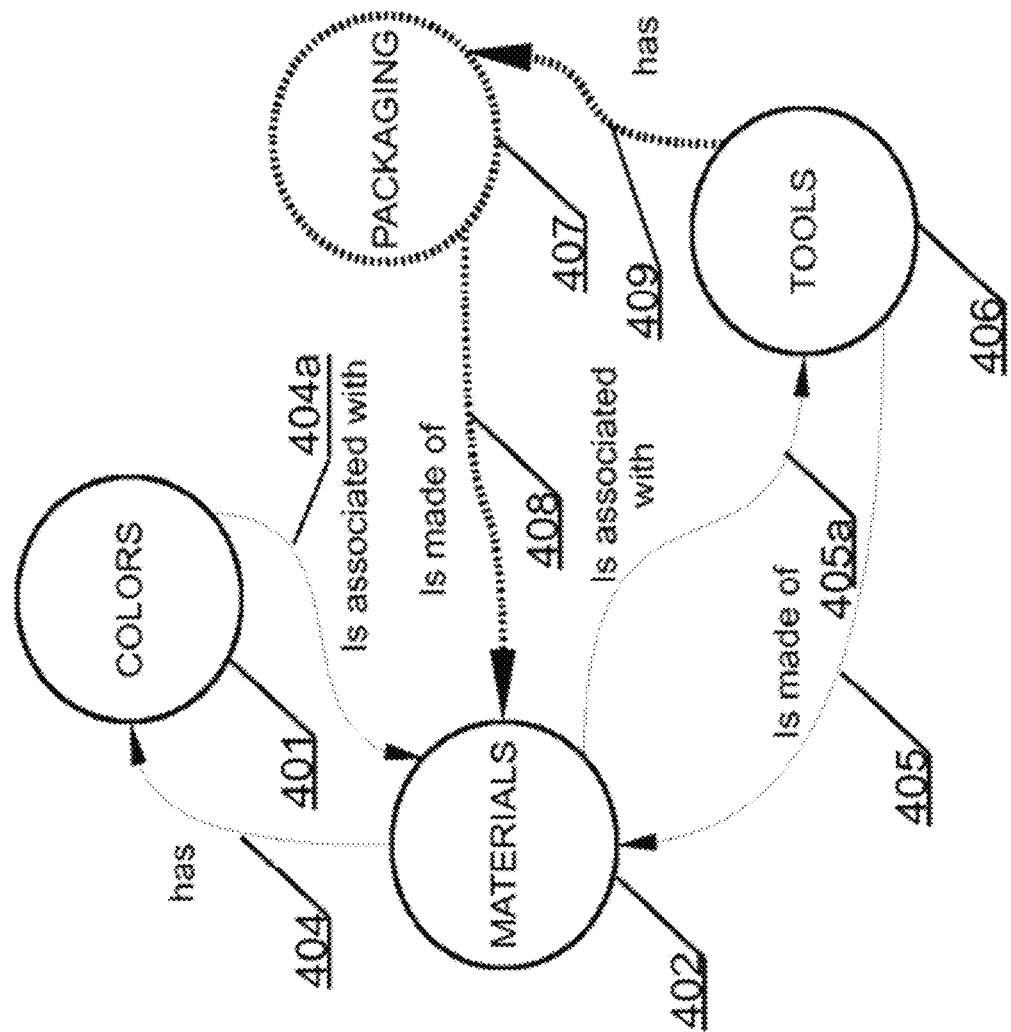
FIG. 4 depicts a mind map that may represent the database of FIG. 2 and FIG. 3.

FIG. 4 depicts a mind map that may represent relationships in the database of FIG. 2. There are three nodes that may represent sets of data, namely COLORS 401, MATERIALS 402 and TOOLS 406. A mind map may additionally define branches between respective nodes. Taking into account the relational database which may be defined according to the new database system in FIGS. 2 and 3, there are four branches. A first branch 404 of the mind map is defined between COLORS 401 and MATERIALS 402 and may imply that a MATERIAL may have a COLOR. A second branch 404a of the mind map may be defined between COLORS 401 and MATERIALS 402 and may imply that a COLOR may be associated with a MATERIAL.

Similar to the first two branches, a third branch 405 of the mind map is defined between MATERIALS 402 and TOOLS 406 and may imply that that a TOOL may be made of a MATERIAL. A fourth branch 405a of the mind map may be defined between MATERIALS 402 and TOOLS 406 and may imply that a MATERIAL may be associated with a TOOL.

The relational database may be further expanded to also encompass a possibility that a TOOL may have 409 a PACKAGING 407 and the PACKAGING is made of a MATERIAL from MATERIALS 408.

In some embodiments, because all identifiers may be generated automatically, during creation of the database system of FIGS. 2-3, one may start from the mind map presented in FIG. 4. For each node, a designer may create a name of a set and properties of the objects that may be kept in the set. Similarly, the designer may create branches as relations between respective nodes, such as data sets. Based on such mind map definitions, the system of FIGS. 2-3 may be automatically generated from the mind map of FIG. 4. In particular embodiments, there may additionally be a process of assigning properties to each node of the mind map, wherein each property is an entry in the second data structure, such as the COLUMNS 206 data structure.

A database structure disclosed herein can be created by a method described as follows. A computer implemented method may store data in a memory and comprise the following blocks, operations, or actions. A first data structure may be created and stored in a memory, wherein the first data structure may comprise a definition of at least one data set, wherein each data set comprises a data set identifier and logically may hold data objects of the same type. Next, a second data structure may be created and stored in the memory, wherein the second data structure may comprise definitions of properties of objects, wherein each property may comprise an identifier of the property and an identifier of a set to which the property is assigned.

Further, a third data structure may be created and stored in the memory, wherein the third data structure may comprise definitions of objects, and wherein each object comprises an identifier and an identifier of a set the object is assigned to. A fourth data structure may be created and stored in the memory, wherein the fourth data structure may comprise definitions of properties of each object, and wherein each property of an object associates a value with an object and a property of the set to which the object is assigned. A fifth data structure may be created and stored in the memory, wherein the fifth data structure may comprise definitions of relations, and wherein each relation comprises an identifier of the relation. Finally, a sixth data structure may be created and stored in the memory, wherein the sixth data structure may comprise definitions of relations between objects wherein each objects relation associates a relation from the fifth data structure to two objects from the third data structure.

In accordance with the database system of the present disclosure (e.g., FIGS. 2-3), a process of adding an object (a record) to the database may be outlined as follows. First a new entry may be created in the OBJECTS data structure 201. The object may be assigned to a given data set defined by the SETS data structure 204. For each object property of the given set defined in the COLUMNS data structure 206, there may be created an entry in the CHARACTERISTICS data structure 301. Subsequently there may be created relations of the new object with existing objects with the aid of the OBJECTS RELATIONS data structure 308.

A method of removing objects from the database system is described below. First, an object to be removed may be identified and its corresponding unique identifier may be fetched. Next, any existing relations of the object to be removed with other existing objects may be removed by deleting entries in the OBJECTS RELATIONS data structure 308 that are related to the object being removed. Subsequently, the object entry may be removed from the OBJECTS data structure 201. The object may be removed from a given data set defined by the SETS data structure 204. Because the properties of each object are stored separately, for each object property of the given set defined in the COLUMNS data structure 206, there is removed an entry in the CHARACTERISTICS data structure 301 related to the object identifier being removed from the database.

A method for creating the database system using a mind map is provided. The first step may be to create a mind map structure. Defining a database system using a mind map may be beneficial and allow a designer to more easily see the big picture in very complex database arrangements. A designer may further be able to visualize the organization of data sets and relations that may exist between the respective data sets. Next, a new node may be added to the mind map structure.

This may typically be executed via a graphical user interface provided to a database designer. A node of a mind map may represent a set as defined with reference to FIG. 2. Therefore, it may be advantageous at this point to define, preferably using the graphical user interface, properties associated with the data set associated with this particular node of the mind map. Then, a record or entry may be stored in the first and second data structures, which are the SETS data structure 204 and COLUMNS data structure 206 of FIG. 2, respectively.

The next step may be to create a branch within the mind map. A branch may start at a node of the mind map and end at the same node of the mind map to define a self-relation. For example, there may be a set of users for which there exists a hierarchy among users. Alternatively or in addition to, a branch may start at a node of the mind map and end at a different node, for example, of the mind map to define a relation between different nodes, i.e., different sets of objects of the same kind.

The following operations may be executed to store a record in the fifth data structure, which is the RELATIONS data structure 305 of FIG. 3. At least one object can be added to existing data sets, i.e., nodes of the mind map. In some embodiments, a way of adding objects to mind map nodes may be by way of a graphical user interface with one or more graphical elements representing nodes and connections among the nodes. For example, by choosing an option to add an object, a user may be presented with a set of properties that may be set for the new object. The properties may be defined in the COLUMNS data structure 206 of FIG. 2. After the user provides an input, an object may be added to the selected node of the mind map by storing one or more records in the third, fourth, and sixth data structures that are the OBJECTS data structure 201, the CHARACTERISTICS data structure 301 and OBJECTS RELATIONS data structure 308 of FIGS. 2 and 3, respectively.

Databases of the present disclosure may store data objects in a non-hierarchical manner. In some cases, such databases may enable database queries to be performed without the need of joins, such as inner or outer joins, which may be resource intensive. This may advantageously improve database queries.

Figure 5:
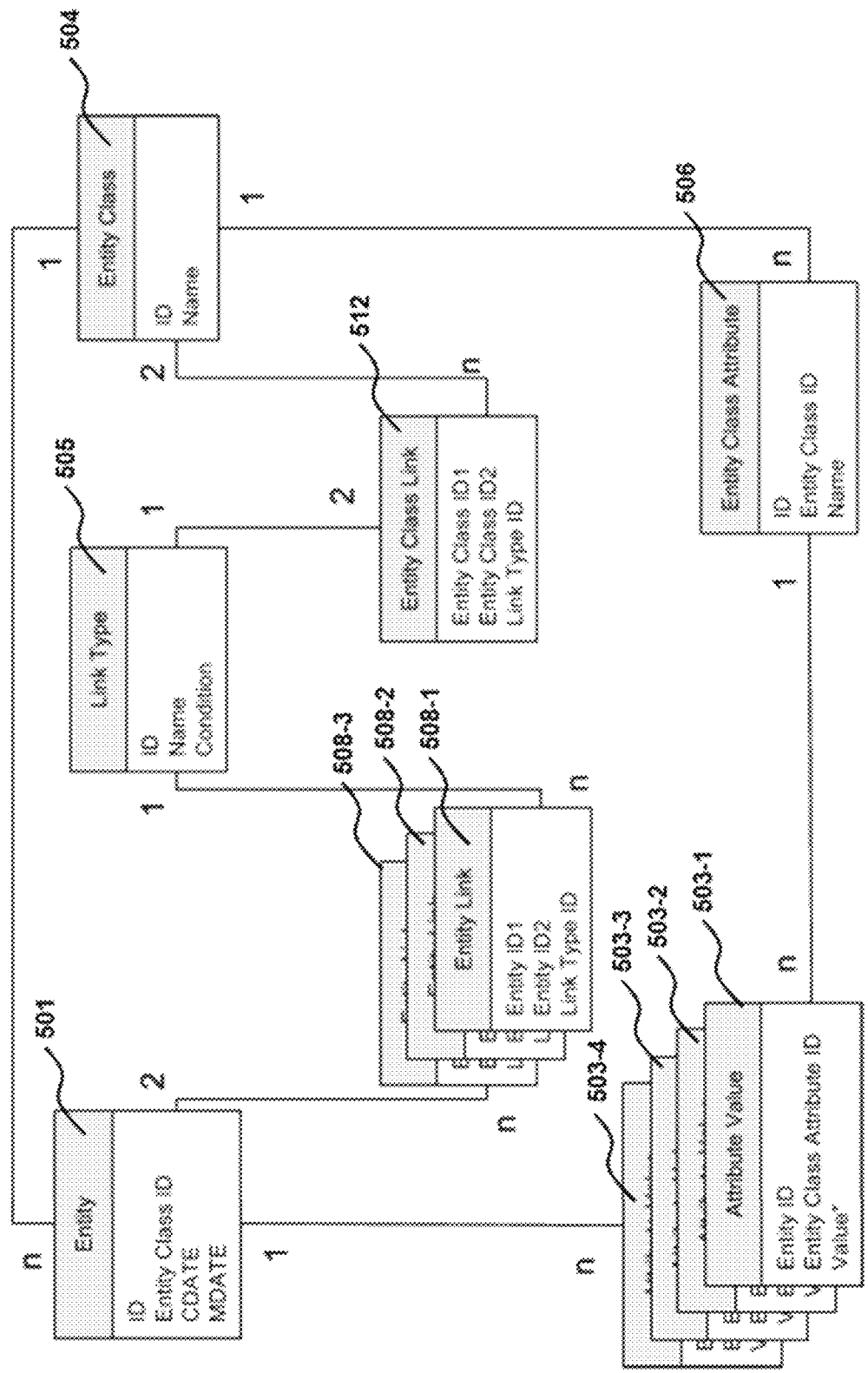
FIG. 5 shows an exemplary model of a database system of the present disclosure.

FIG. 5 shows an exemplary model of a database system of the present disclosure. The model may be similar to, or correspond to, the examples of the database systems described in FIG. 2 and FIG. 3. The model may comprise a set of predefined data structures. In the illustrated model, the Entity data structure 501 may correspond to the OBJECTS data structure 201 as described in FIG. 2. Similarly, the Entity data structure may hold entries uniquely identified with an identifier ID (e.g., ID) and associated with an entity class, defined in the Entity Class data structure 504, with the aid of an identifier herein called Entity Class ID. The Entity data structure 501, in some embodiments, may further comprise a timestamp corresponding to the date and time an object is created (e.g., CDATE) and/or date and time an object is last modified (e.g., MDATE).

The Entity Class data structure can correspond to the SETS data structure 204 as described in FIG. 2. Similarly, the Entity Class data structure may hold data related to Entity Class data. Classes of data may be represented on a mind map as nodes. Each entry in an Entity Class data structure 504 may comprise at least a unique identifier (e.g., ID) and may also comprise its name (e.g., Name). For each entity property of the given entity class defined in the Entity Class Attribute data structure 506, there may be created an entry in the Attribute Value data structure 503-1, 503-2, 503-3, 503-4. Subsequently there may be created relations of the new object with existing objects with the aid of the Entity Link data structure 508-1, 508-2, 508-3.

The Entity Class Attribute data structure 506 can correspond to the COLUMNS data structure 206 as described in FIG. 2. Similarly, the Entity class Attribute data structure 506 may hold entries uniquely identified with an identifier ID (e.g., ID) that is associated with an entity class, defined in the Entity Class data structure 504, with the aid of the Entity Class ID, and the name of the attribute (e.g., Name). The Attribute Value data structure 503-1, 503-2, 503-3, 503-4 may correspond to the CHARACTERISTICS data structure 301 as described in FIG. 3, except that the Attribute Value data structure may use multiple tables 503-1, 503-2, 503-3, 503-4 to hold entries uniquely identified using an identifier (e.g., Entity ID), a property defined in the Entity class Attribute data structure 506, with the aid of an identifier (Entity Class Attribute ID) and a value of a given property of the particular entity (e.g., Value). In some cases, the multiple tables may collectively hold the attribute values with each table storing a portion of the data.

The Entity Link data structure 508-1, 508-2, 508-3 can correspond to the OBJECTS RELATIONS data structure 308 as described in FIG. 3 with the exception that multiple tables 508-1, 508-2, 508-3 may be used to collectively hold data related to relations or connections between two entities. Similarly, an entry of the Entity Link data structure may comprise two entity IDs (e.g., Entity ID1, Entity ID2) and the identifier of the Link Type (e.g., Link Type ID) between the two entities. The Link Type identifier may reference from the Link Type data structure 505.

The Link Type data structure 505 can correspond to the RELATIONS data structure 305 as described in FIG. 3. Similarly, the Link Type data structure 505 may hold an identifier of a link type ID (e.g., ID) and additionally hold a textual description of the link (e.g., NAME). In some cases, the link type can define a permission level of accessing the connection between entities or entity classes. For example, the link type may be a private type link that only the user who creates the link or the system administer can view or modify, or a public type link that can be viewed or defined by any user. For instance, an administrator or certain users with privileges may configure a link to be visible to other users. In this case, the administrator may decide to "publish" the link, which may enable the link to be available to the public, thereby converting the link type from private to public. Alternatively or in addition to, a link type may have various other permission levels or editable privileges that are provided by the system.

A combined analysis result may comprise scores stored using the aforementioned data structures. For example, when combining multiple analyses results, scores may be generated by creating an entity class 504 comprising an entity class ID and a name (e.g., score). One or more entity class attributes 506 may be created to describe a score. The entity class attributes may comprise, for example, value of a score and metadata such as a timestamp at which the score is calculated. Similarly, attribute values associated with each entity class attribute may be generated and stored compliant with the attribute value data structure 503-1, 503-2, 503-3, 503-4. In some cases, a relation between the score and the data object may be created and stored such that scores associated with a data object can be tracked. The relation can be stored using the link type 505, entity class link 512, and entity link 508-1, 508-2, 508-3 data structures. A combined analysis may also be referred to herein as a combined search, which are used interchangeably throughout the specification.

In some cases, a result dataset of the combined analysis may be stored in a table. In some cases, each entry of the table may comprise at least a score and an entity class ID of the data object for which the scored is calculated. The table may comprise other columns such as a timestamp associated with the score and/or name of the analysis that contributes to the score.

Examples of Visualized Databases and Combined Analysis

Methods of the present disclosure may include the use of data objects. A data object stored in a data structure may be linked with another data object in the same data structure or in another data structure. However, the two data objects may be related to a single abstract class. For example, an enterprise may have multiple clients, and each client may have an identifier, a purchased product, and billing information. In a database, a client identifier and a purchased product may be placed together in a structure of a sale, but a client identifier and billing information may be organized into a structure of finance. However, an abstract class representing a client may aggregate an identifier, a purchased product, and billing information. In some embodiments, a database can be visualized as a graph with each entity class depicted as a node and connections between classes depicted as links. An interactive breadcrumb associated with an analysis or search path may be presented to a user on a user interface (UI) along with the graph. Beneficially, a visualized graph may allow a user to see a bigger picture of aggregated data objects in terms of abstract classes without going into the details of data objects. In some embodiments, a user interface may be provided to allow users to assign weights to multiple analyses and then combine the analyses into an integrated analysis.

The user interfaces may be displayed, for example, via a web browser (e.g., as a web page), a mobile application, and/or a standalone application. In some embodiments, the user interfaces shown may also be displayed on any suitable computer device, such as a cell/smart phone, tablet, wearable computing device, portable/mobile computing device, desktop, laptop, or personal computer, and are not limited to the examples as described herein. In some cases, multiple user interfaces may be switchable. A user may switch between different user interfaces than illustrated here. The user interfaces and functionality described herein may be provided by software executing on the individual's computing device, by a data analysis system located remotely that is in communication with the computing device via one or more networks, and/or some combination of software executing on the computing device and the data analysis system. The user interfaces may be provided by a cloud computing system. In some embodiments, analogous interfaces may be presented using audio or other forms of communication. In some embodiments, the interfaces may be configured to be interactive and respond to various user interactions. Such user interactions may include clicking or dragging with a mouse, manipulating a joystick, typing with a keyboard, touches and/or gestures on a touch screen, voice commands, physical gestures made in contact or within proximity of a user interface, and the like.

Figure 6:
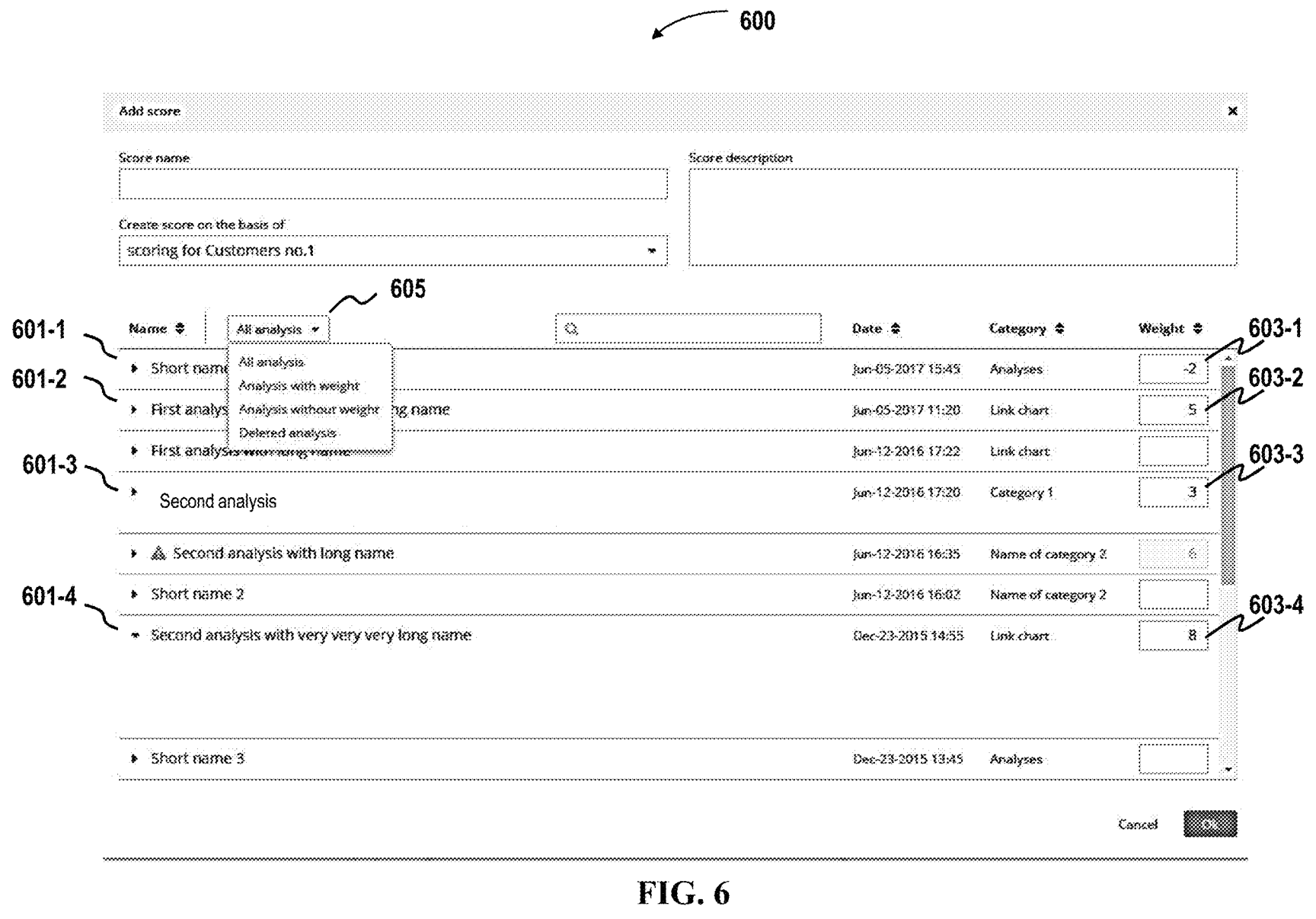

FIG. 6 shows an example of a scoring interface 600, in accordance with embodiments of the invention. The scoring interface 600 may be configured to receive one or more user inputs. The user inputs may comprise selecting one or more analyses and/or inputting a value of a weight. As shown in the illustrated example, multiple individual analyses 601-1, 601-2, 601-3, 601-4 are selected from a plurality of analyses. The plurality of analyses may be provided to a user via the scoring interface. In some cases, the plurality of analyses may be automatically displayed in response to a user selection of a target set or main set for the combined analysis. For instance, upon a selection of a dataset, a list of analyses having the selected dataset as their main set may be populated and provided to a user for selection. While FIG. 6 illustrates the selection of four analyses, the user may select any number of analyses to combine. For example, the user may select at least 2, 3, 4, 5, 6, 7, 8, 9, 10, 20, 30, 40, 50 or more analyses. Alternatively, the user may select at most 50, 40, 30, 20, 10, 9, 8, 7, 6, 5, 4, 3, 2, or fewer analyses.

A user may be prompted to enter a weight value 603-1, 603-2, 603-3, 603-4 for each analysis respectively. As mentioned above, a value of weight can be in any range (e.g., negative to positive) and may have any precision. The scoring interface may be configured to allow a user to input other descriptive information such as score name or score description for labeling a combined analysis.

The scoring interface 600 may be configured to display a selected subset of the analyses. In some cases, the scoring interface may provide multiple options 605 for selecting a subset of analyses (e.g., all analysis, analysis with weight, analysis without weight, deleted analysis) to view.

In some cases, the scoring interface 600 may be displayed upon receiving a user input indicating adding score for a selected dataset. A selected dataset for analysis may be a target set or main set. The selected dataset may also be the main set of the multiple analyses to be combined together.

Figure 7:
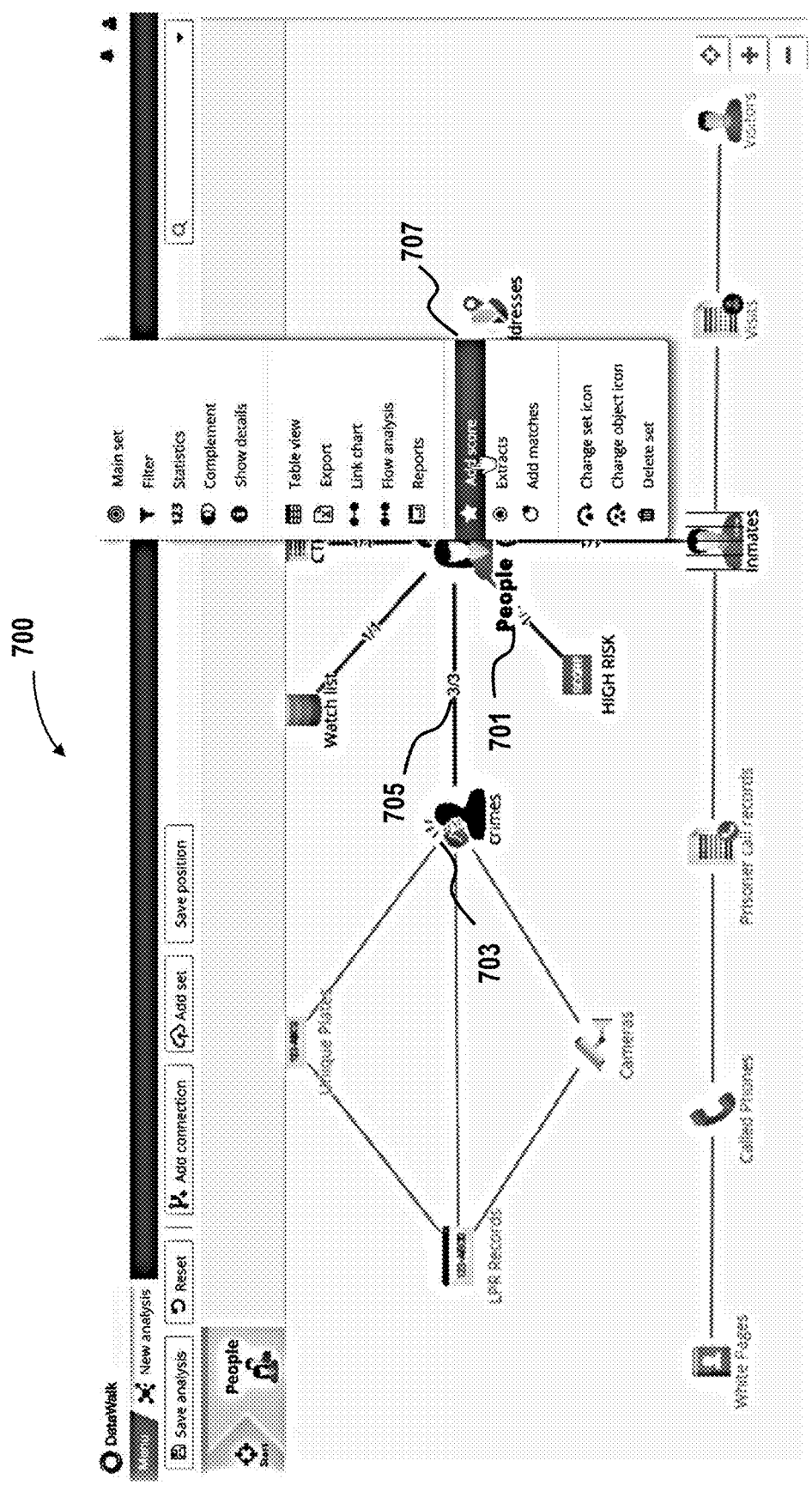
FIG. 7 shows an example of adding a combined analysis in a visualized database.
Figure 8:
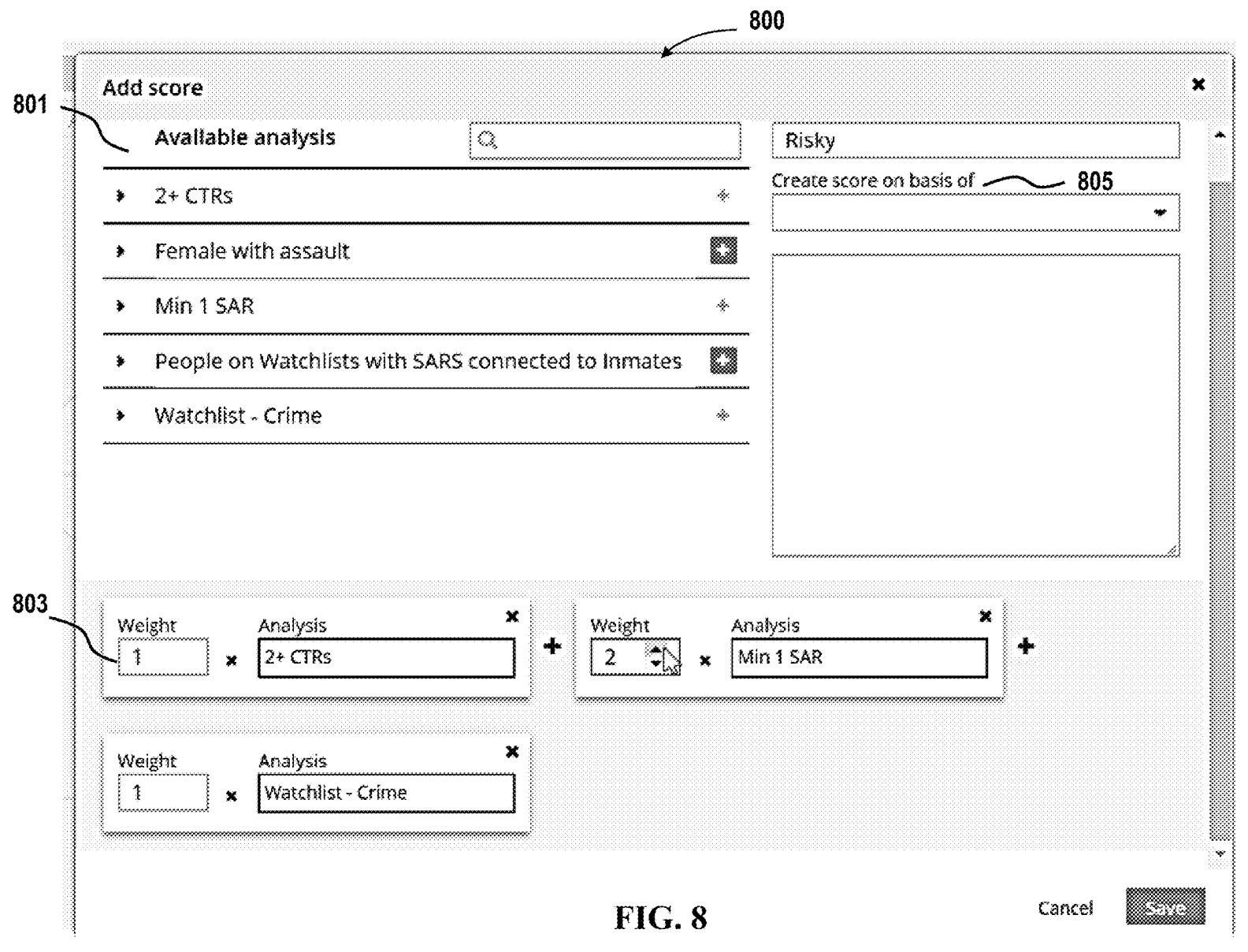

FIG. 7 and FIG. 8 show an example of adding a combined analysis in a visualized database 700 and assigning weights to selected analyses via a scoring interface 800. In the visualized database 700, each class (e.g., people) can be visualized as a graph node. In the illustrated example, a class may include, but is not limited to, People 701, crimes 703, watch list, CTRs, SARs, Addresses, Phones, Inmates, Visits, Visitors, Prisoner Call records, Called Phones, Cameras, Unique Plates, and LPR Records. Further, such visualized classes may be linked. A link (for instance, link 705 between People 701 and crimes 703) may be a representation of a link of underlying data objects or entities. In some applications, a link can mean a JOIN command in a database. In some cases, a visualized link may comprise an assigned link type; in other words, a link may be further associated with a meaning beyond merely a join. Multiple analyses may be performed via the visualized database 700. The multiple analyses may be generated by creating multiple breadcrumbs or search paths in the graphical database. The search path may be an interactive search path as described elsewhere herein. In some embodiments, the search path (i.e., operations in a search path) and the associated search result may be stored.

A dataset from a plurality of datasets may be selected as the main set for a combined analysis. The selected dataset may be a main set shared by multiple analyses. In the illustrated example, a user may select a dataset by submitting a request (e.g., add score 707) via the visualized interface 700. In some cases, in response to the request, a scoring interface 800 as shown in FIG. 8 may be displayed to a user.

In some instances, the scoring interface 800 may correspond to, or comprise, the scoring interface shown in FIG. 6. The scoring interface 800 may provide a list of analyses 801 for a user to select from to combine into an integrated analysis. In some cases, the each analysis in the list of analyses 801 may have the selected dataset (e.g. People 701) as its main set. In some cases, the list of analyses 801 may comprise the individual analyses for which the respective result datasets share the same entity class. A user may select any number of analyses from the list. In the example, three analyses are selected (e.g., 2+ CTRs, MIN 1 SAR, Watchlist-Crime). Upon receiving a selection of the analysis, the scoring interface 800 may prompt a user to input weight 803 for the selected analyses. In some cases, the unselected analyses may be assigned a weight of zero by default.

The scoring interface 800 may also allow a user to input descriptive information for the combined analysis. For example, a user may record a name of the analysis (e.g., Risky) or description about the analysis such as rules for assigning weights via the scoring interface. In some cases, the scoring interface 800 may provide options for creating a combined analysis based on a previous combined analysis. For instance, a user may select a previous combined analysis from a list of options (e.g., create score on basis of 805) then modify one or more parameters such as weights or change the selection of an analysis to reach a new combined analysis. In some cases, upon receiving a selection of a previous combined analysis, weights 803 and selection of analyses 801 of the previous combined analysis may be automatically populated for a user to adjust or modify. This may be beneficial for reducing computation time, thus improving efficiency of calculating scores for the new analysis.

Figure 9:
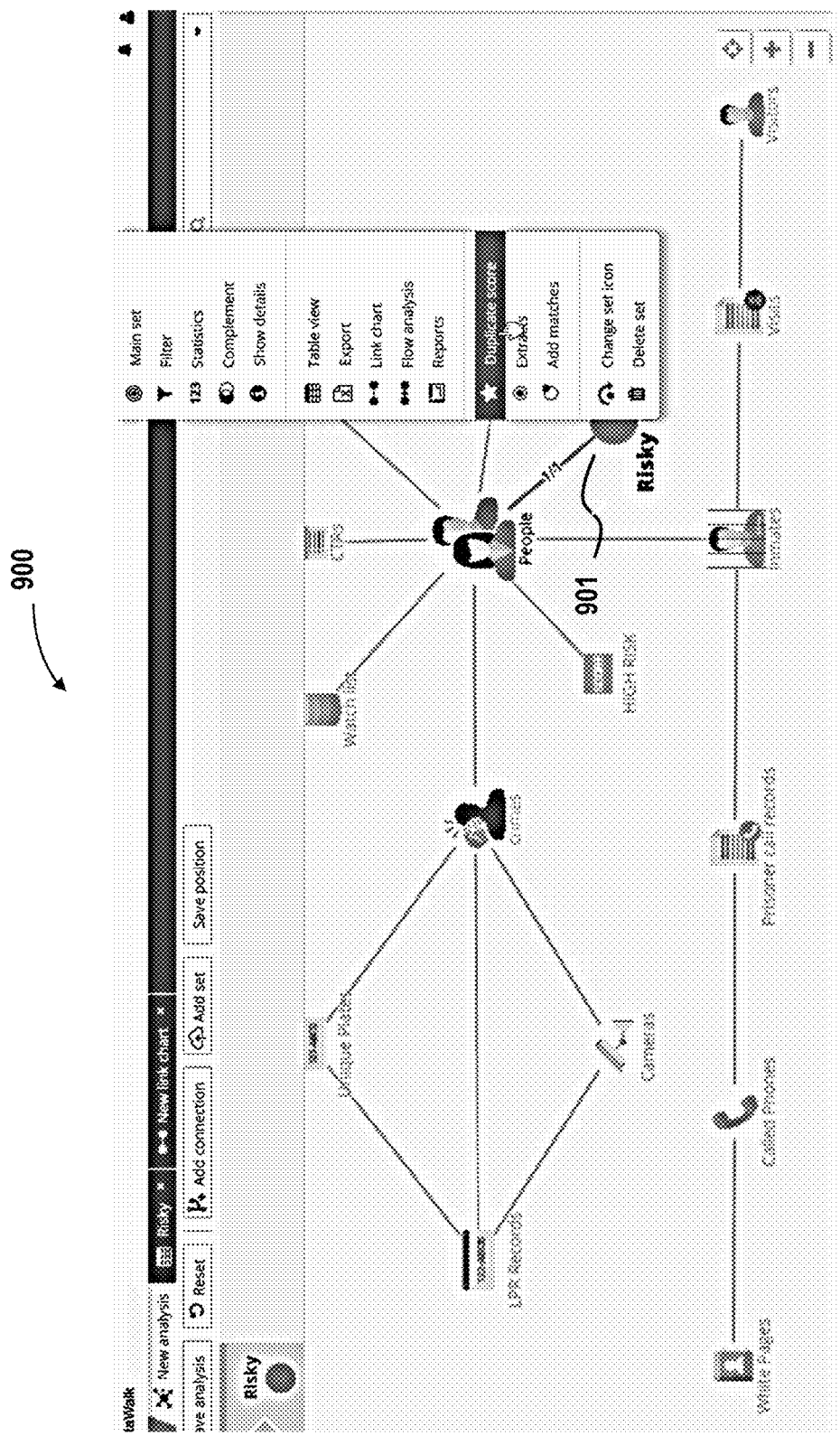
FIG. 9 illustrates an example of presenting the combined analysis or result dataset of the combined analysis in the visualized database.

In some embodiments, upon receiving a command indicating completion of assigning weights (e.g., clicking save button on the bottom of the scoring interface 800), scores of the merged result datasets may be calculated. In some cases, a combined analysis/search or corresponding analysis result dataset may be displayed in the visualized database. FIG. 9 illustrates an example of presenting the combined analysis or result dataset of the combined analysis in the visualized database 900. In the example, the combined analysis Risky 901 may be automatically generated and displayed in the visualized database 900. A graphical element representing the result dataset (e.g., Risky 901) and a connection between the result dataset (e.g., Risky 901) and the linked entity (e.g., People) may be automatically generated and displayed in the visualized database. The combined analysis or result dataset of the combined analysis may be under further investigation by establishing links to other entities in the database. In some cases, a new search path may be created for filtering on the Risky data set.

In some embodiments, a new combined analysis can be created based on a previous analysis. For example, a user may select (e.g., click) the "Duplicate score" on the populated options of the result dataset (e.g., Risky dataset) indicating submission of a request for creating a new analysis. In response to the request, the scoring interface may be displayed to the user as described in FIG. 8. In some embodiments, a new combined analysis can be created by combining a plurality of other combined analyses, each combining individual analyses.

Figure 11:
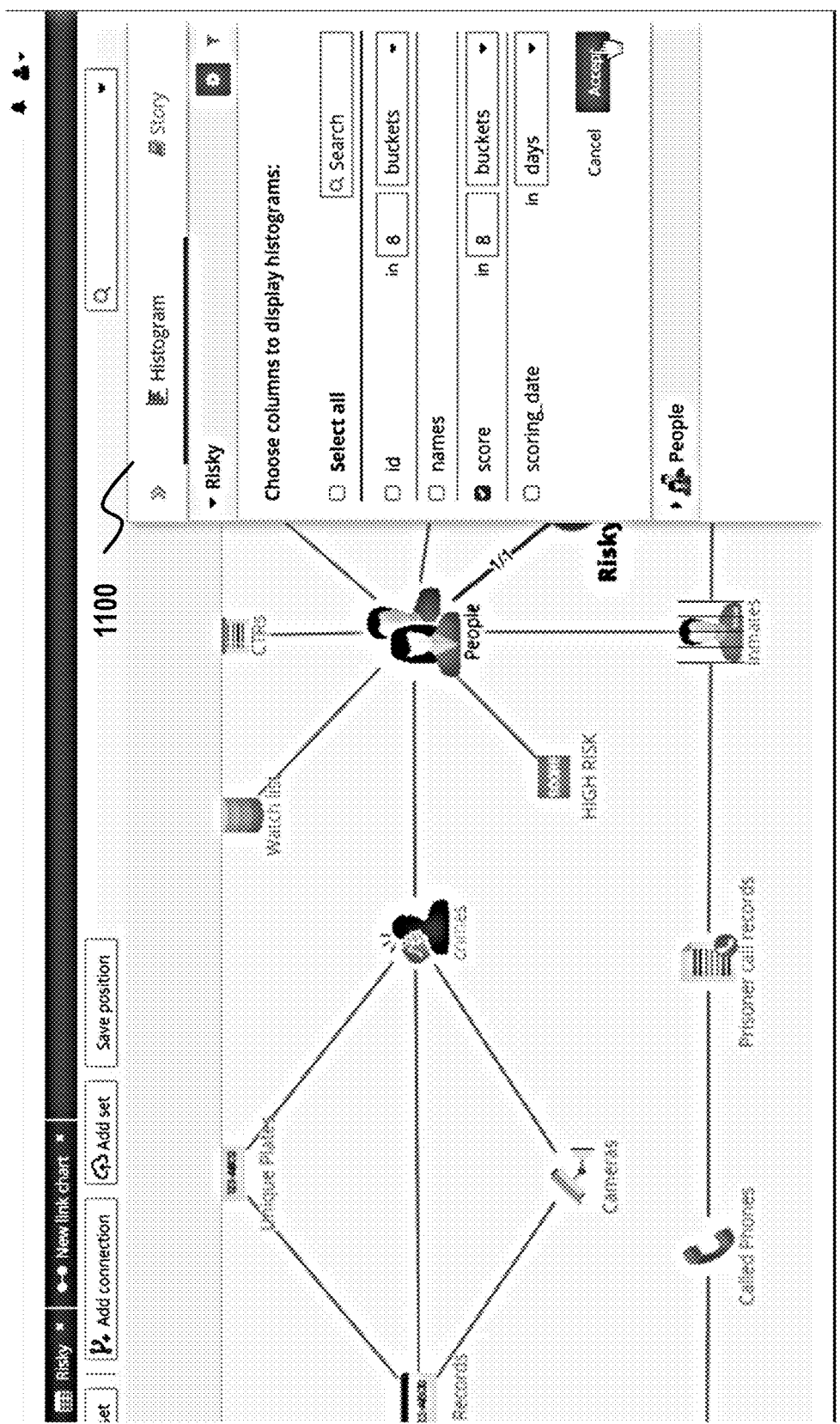
FIG. 11 shows an example of analyzing a combined analysis result in histogram format.
Figure 12:
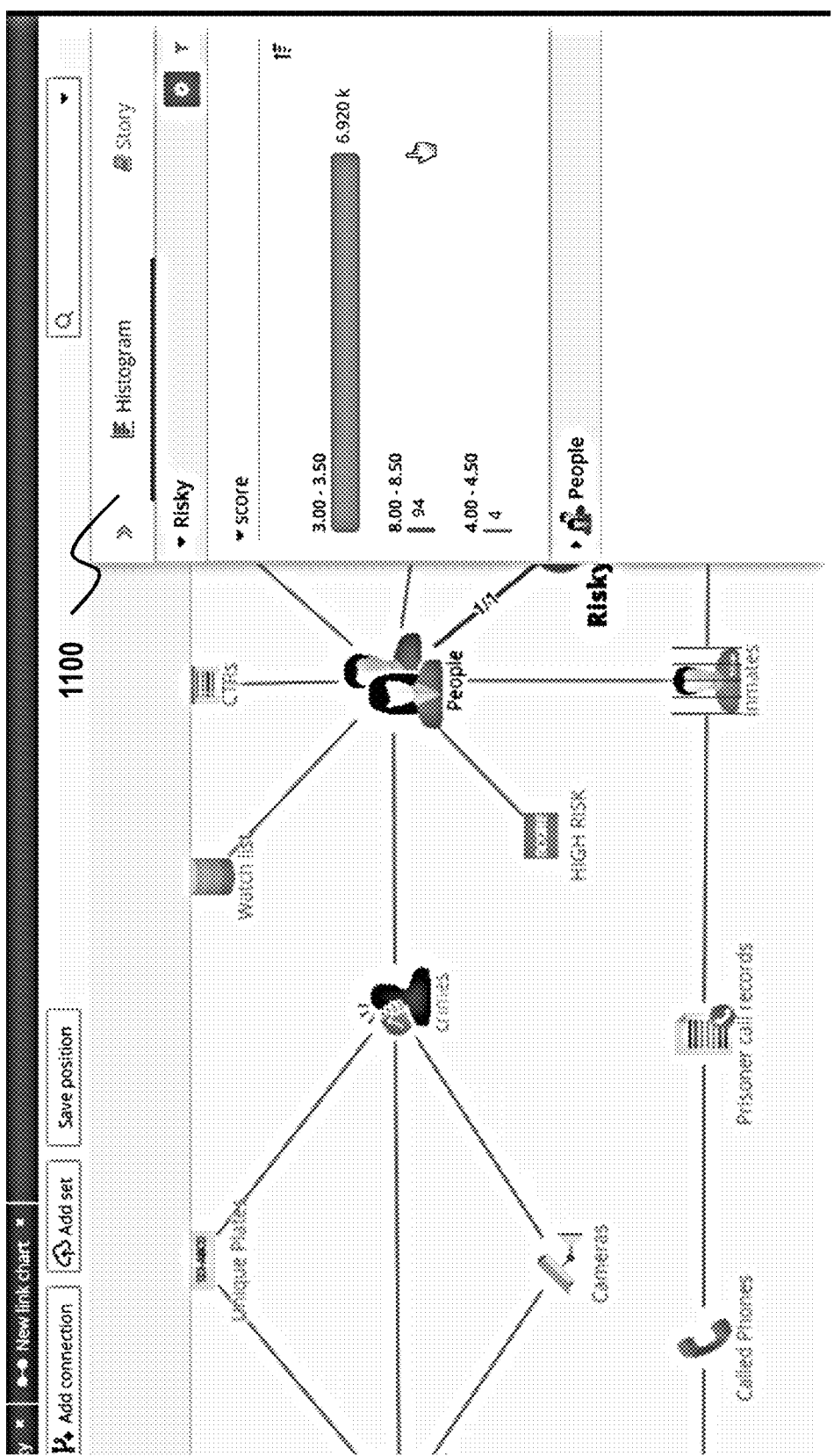
FIG. 12 shows an example of presenting a combined analysis result in histogram format.

The combined analysis result can be presented in multiple formats. The multiple formats may provide options for further analysis of the combined analysis result. FIGS. 10-12 show examples of displaying a combined analysis result, in accordance with embodiments of the invention.

FIG. 10 shows an example of presenting and analyzing a combined analysis result in table format 1000. The combined analysis result may comprise a table comprising a plurality of columns. In an example, the columns may comprise scores, names of the analyses that contribute to the score, ID of the data object for which the score is calculated, and a timestamp associated with generating the score. The table may comprise more or fewer columns than the illustrated example. The table format 700 may comprise options for sorting, ranking, and/or selecting at least a subset of the combined analysis result. For example, the analysis result may be sorted and/or ranked by score, names of the analysis, and/or timestamp of the score. The analysis result may be ranked and/or sorted based on any user-selected or user-defined rule. The rules may include, for example, ranking low to high by score, ranking high to low by score, highest 20%, lowest 30%, score above a threshold, below a threshold, in a defined range, and the like.

FIG. 11 and FIG. 12 show examples of presenting and analyzing a combined analysis result in a histogram view 1100. The histogram view 1100 may provide one or more visual or graphical representations for a user to view and further analyze the result. It should be noted that the format is not limited to histograms. Various other presentation formats such as bar charts, pie charts, line charts, textual representations (e.g., numbers, text), multimedia representations (e.g., audio and/or video clips), and the like can be used for displaying and analyzing the result. A user may be allowed to edit the one or more visual or graphical representations. For instance, a user may determine a bucket size for a selected column, and/or select columns (e.g., score) to be displayed.

Methods and systems of the present disclosure may be combined with other methods and systems, such as those described in U.S. patent application Ser. No. 14/222,795, filed Mar. 24, 2014, U.S. patent application Ser. No. 14/315, 481, filed Jun. 26, 2014, U.S. patent application Ser. No. 14/469,958, filed Aug. 27, 2014, U.S. patent application Ser. No. 14/469,968, filed Aug. 27, 2014, U.S. Patent Application No. 62/595,490, filed Dec. 6, 2017, each of which is entirely incorporated herein by reference. Such methods and systems, for example, may be used with methods and systems of the present disclosure to store data as a mind map in a relational database system.

Computer Systems

Figure 13:
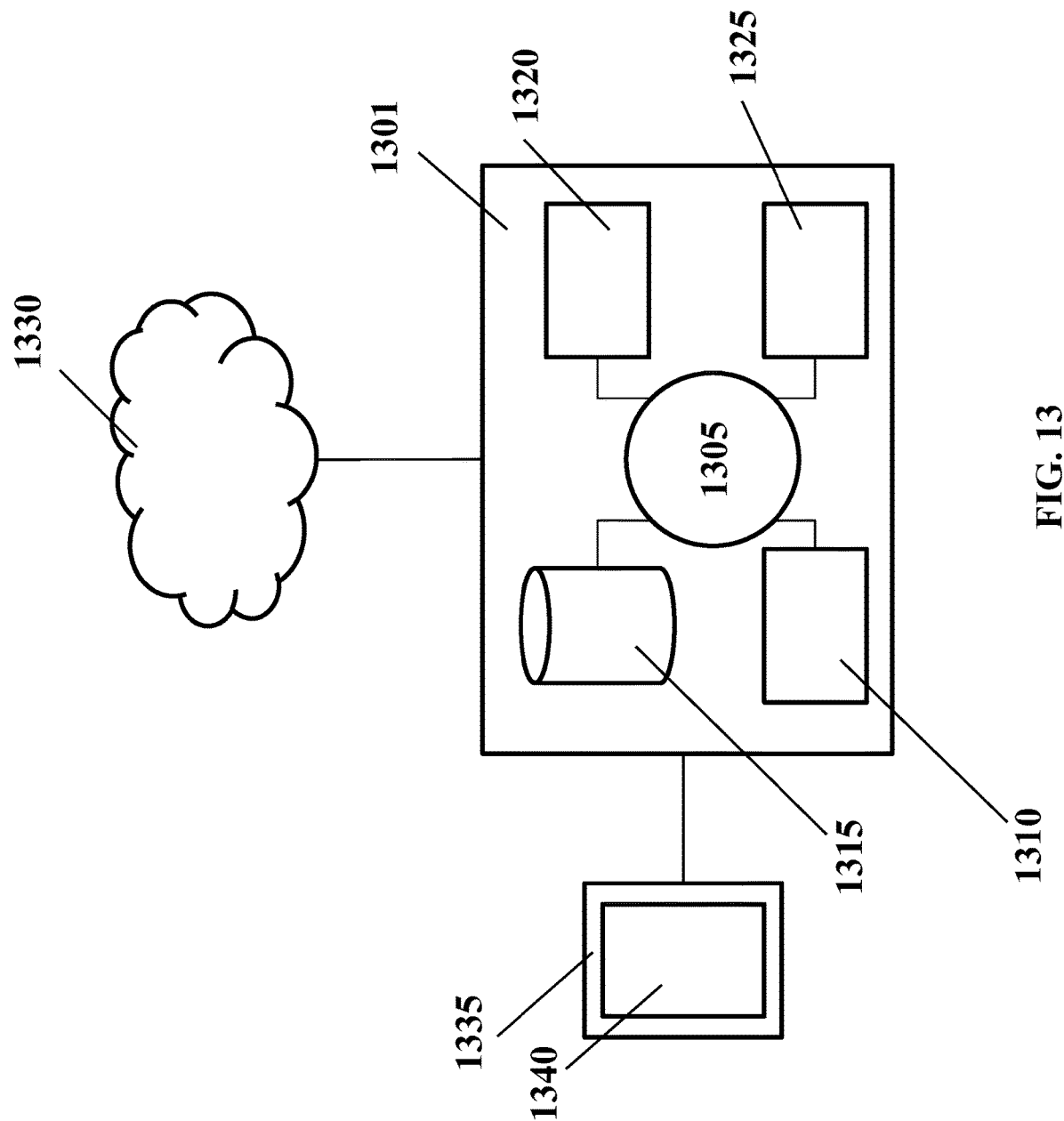
FIG. 13 shows a computer system that is programmed or otherwise configured to combine and score multiple analyses.

The present disclosure provides computer systems that are programmed to implement methods of the disclosure. FIG. 13 shows a computer system 1301 that is programmed or otherwise configured to combine and score multiple analyses. The computer system 1301 can regulate various aspects of visualization, queries and graph analysis of the present disclosure, such as, for example, generating a combined analysis by combining multiple weighted analyses. The computer system 1301 can be an electronic device of a user or a computer system that is remotely located with respect to the electronic device. The electronic device can be a mobile electronic device.

The computer system 1301 includes a central processing unit (CPU, also "processor" and "computer processor" herein) 1305, which can be a single core or multi core processor, or a plurality of processors for parallel processing. The computer system 1301 also includes memory or memory location 1310 (e.g., random-access memory, read-only memory, flash memory), electronic storage unit 1315 (e.g., hard disk), communication interface 1320 (e.g., network adapter) for communicating with one or more other systems, and peripheral devices 1325, such as cache, other memory, data storage and/or electronic display adapters. The memory 1310, storage unit 1315, interface 1320 and peripheral devices 1325 are in communication with the CPU 1305 through a communication bus (solid lines), such as a motherboard. The storage unit 1315 can be a data storage unit (or data repository) for storing data. The computer system 1301 can be operatively coupled to a computer network ("network") 1330 with the aid of the communication interface 1320. The network 1330 can be the Internet, an internet and/or extranet, or an intranet and/or extranet that is in communication with the Internet. The network 1330 in some cases is a telecommunication and/or data network. The network 1330 can include one or more computer servers, which can enable distributed computing, such as cloud computing. The network 1330, in some cases with the aid of the computer system 1301, can implement a peer-to-peer network, which may enable devices coupled to the computer system 1301 to behave as a client or a server.

The CPU 1305 can execute a sequence of machine-readable instructions, which can be embodied in a program or software. The instructions may be stored in a memory location, such as the memory 1310. The instructions can be directed to the CPU 1305, which can subsequently program or otherwise configure the CPU 1305 to implement methods of the present disclosure. Examples of operations performed by the CPU 1305 can include fetch, decode, execute, and writeback.

The CPU 1305 can be part of a circuit, such as an integrated circuit. One or more other components of the system 1301 can be included in the circuit. In some cases, the circuit is an application specific integrated circuit (ASIC).

The storage unit 1315 can store files, such as drivers, libraries and saved programs. The storage unit 1315 can store user data, e.g., user preferences and user programs. The computer system 1301 in some cases can include one or more additional data storage units that are external to the computer system 1301, such as located on a remote server that is in communication with the computer system 1301 through an intranet or the Internet.

The computer system 1301 can communicate with one or more remote computer systems through the network 1330. For instance, the computer system 1301 can communicate with a remote computer system of a user (e.g., a webserver, a database server). Examples of remote computer systems include personal computers (e.g., portable PC), slate or tablet PC's (e.g., Apple® iPad, Samsung® Galaxy Tab), telephones, Smart phones (e.g., Apple® iPhone, Android-enabled device, Blackberry®), or personal digital assistants. The user can access the computer system 1301 via the network 1330.

Methods as described herein can be implemented by way of machine (e.g., computer processor) executable code stored on an electronic storage location of the computer system 1301, such as, for example, on the memory 1310 or electronic storage unit 1315. The machine executable or machine readable code can be provided in the form of software. During use, the code can be executed by the processor 1305. In some cases, the code can be retrieved from the storage unit 1315 and stored on the memory 1310 for ready access by the processor 1305. In some situations, the electronic storage unit 1315 can be precluded, and machine-executable instructions are stored on memory 1310.

The code can be pre-compiled and configured for use with a machine have a processor adapted to execute the code, or can be compiled during runtime. The code can be supplied in a programming language that can be selected to enable the code to execute in a pre-compiled or as-compiled fashion.

Aspects of the systems and methods provided herein, such as the computer system 1301, can be embodied in programming. Various aspects of the technology may be thought of as "products" or "articles of manufacture" typically in the form of machine (or processor) executable code and/or associated data that is carried on or embodied in a type of machine readable medium. Machine-executable code can be stored on an electronic storage unit, such memory (e.g., read-only memory, random-access memory, flash memory) or a hard disk. "Storage" type media can include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer into the computer platform of an application server. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to non-transitory, tangible "storage" media, terms such as computer or machine "readable medium" refer to any medium that participates in providing instructions to a processor for execution.

Hence, a machine readable medium, such as computer-executable code, may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the databases, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media may take the form of electric or electromagnetic signals, or acoustic or light waves such as those generated during radio frequency (RF) and infrared (IR) data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a ROM, a PROM and EPROM, a FLASH-EPROM, any other memory chip or cartridge, a carrier wave transporting data or instructions, cables or links transporting such a carrier wave, or any other medium from which a computer may read programming code and/or data. Many of these forms of computer readable media may be involved in carrying one or more sequences of one or more instructions to a processor for execution.

The computer system 1301 can include or be in communication with an electronic display 1335 that comprises a user interface (UI) 1340 for providing, for example, visualization. Examples of UI's include, without limitation, a graphical user interface (GUI) and web-based user interface.

Methods and systems of the present disclosure can be implemented by way of one or more algorithms. An algorithm can be implemented by way of software upon execution by the central processing unit 1305.

While preferred embodiments of the present invention have been shown and described herein, it will be obvious to those skilled in the art that such embodiments are provided by way of example only. It is not intended that the invention be limited by the specific examples provided within the specification. While the invention has been described with reference to the aforementioned specification, the descriptions and illustrations of the embodiments herein are not meant to be construed in a limiting sense. Numerous variations, changes, and substitutions will now occur to those skilled in the art without departing from the invention. Furthermore, it shall be understood that all aspects of the invention are not limited to the specific depictions, configurations or relative proportions set forth herein which depend upon a variety of conditions and variables. It should be understood that various alternatives to the embodiments of the invention described herein may be employed in practicing the invention. It is therefore contemplated that the invention shall also cover any such alternatives, modifications, variations or equivalents. It is intended that the following claims define the scope of the invention and that methods and structures within the scope of these claims and their equivalents be covered thereby.

What is claimed is:

1. A computer-implemented method for scoring combined database search results, comprising:
   (a) performing a plurality of individual database searches on data objects stored in a relational database to generate an individual search result for each of the plurality of individual searches, wherein each of the plurality of individual database searches corresponds to a search path traversing from a first subset of data objects stored in said relational database to a second subset of data objects stored in said relational database and wherein said search path is displayed on a graphical user interface (GUI) with a first node representing said first subset of data objects and a second node representing said second subset of data objects, wherein the data objects are stored in defined fixed data structures in a tabular form in the relational database based on a mind map, and wherein each individual search result comprises a given subset of the data objects;
   (b) selecting, via the GUI, a node representing a data set from a plurality of subsets of data objects to add a score, wherein the data set is shared by at least two search paths corresponding to two of the plurality of individual database searches, and generating a combined analysis by merging the plurality of individual database search results to generate a combined search result, wherein the combined search result comprises a combined subset of the data objects from said data set;
   (c) determining and assigning a weight value for each of the plurality of individual database searches for calculating scores associated with the combined subset of the data objects; and
   (d) presenting the combined search result to a user on the GUI, wherein the combined search result comprises the scores associated with the combined subset of the data objects, wherein a score associated with a data object from the combined subset of the data objects is calculated as a weighted sum based at least in part on the weight value assigned to a given individual database search and a count of the data object shown in the combined subset of the data objects.

2. The computer-implemented method of claim 1, wherein the scores associated with the combined subset of the data objects are stored in the relational database in the defined fixed data structures.

3. The computer-implemented method of claim 2, wherein at least one of the defined fixed data structures is configured to store definitions of properties of the scores, wherein the properties of the scores comprise at least a scoring value, a timestamp, and indication of contribution of an individual database search.

4. The computer-implemented method of claim 3, further comprising sorting the combined search results by two or more of the properties of the scores.

5. The computer-implemented method of claim 1, wherein the weight value is determined in response to an input from the user.

6. The computer-implemented method of claim 1, wherein the weight value is automatically determined based on historical data.

7. The computer-implemented method of claim 6, wherein the weight value is determined using an algorithm trained on the historical data.

8. The computer-implemented method of claim 1, wherein the combined search result further comprises a timestamp associated with each of the scores and one or more of individual database searches contributing to each score.

9. The computer-implemented method of claim 8, further comprising sorting the combined search result according to respective values of the scores or the respective timestamps of the scores.

10. The computer-implemented method of claim 1, wherein the scores are presented in a histogram on the GUI.

11. The computer-implemented method of claim 1, wherein the weight value is received via the GUI.

12. The computer-implemented method of claim 1, wherein the defined fixed data structures comprise:
   a first data structure, stored in a memory, comprising a definition of data sets in a relational database, wherein a definition of a data set comprises a unique data set identifier and a set name;
   a second data structure, stored in the memory, comprising definitions of properties of objects in the relational database, wherein a definition of a property comprises a unique identifier of the property and a data set identifier, from the first data structure, the property is assigned to;
   a third data structure, stored in the memory, comprising definitions of objects of the data sets in the relational database, wherein a definition of an object comprises a unique object identifier and a data set identifier, from the first data structure, the object is assigned to;
   a fourth data structure, stored in the memory, comprising definitions of object values of the data sets in the relational database, wherein a definition of object value comprises an object identifier, from the third data structure, and a property of the data set, from the second data structure, the object value being assigned to;
   a fifth data structure, stored in the memory, comprising definitions of relations of data sets in the relational database, wherein a definition of a relation comprises a unique identifier of the relation and a name of the relation; and
   a sixth data structure, stored in the memory, comprising definitions of objects relations between the objects in the relational database, wherein a definition of an object relation associates a relation, from the fifth data structure, with two object identifiers from the third data structure
   wherein the defined fixed data structures further comprise a seventh data structure, stored in the memory, comprising definitions of set relations between data sets in the relational database, wherein a definition of a set relation associates a relation, form the fifth data structure, with two set identifiers from the first data structure.

13. The computer-implemented method of claim 1, wherein merging the plurality of individual database search results comprises applying a UNION operation to the plurality of individual database search results.

14. A system for scoring combined search results comprising:
   a relational database that stores data objects in a non-hierarchical manner; and
   one or more computer processors operatively coupled to the relational database, wherein the one or more computer processors are individually or collectively programmed to:
   (i) perform a plurality of individual database searches on the data objects, wherein each individual search result comprises a given subset of the data objects and wherein each of the plurality of individual database searches corresponds to a search path traversing from a first subset of data objects stored in said relational database to a second subset of data objects stored in said relational database and wherein said search path is displayed on a graphical user interface (GUI) with a first node representing said first subset of data objects and a second node representing said second subset of data objects, wherein said data objects are stored in defined fixed data structures in said relational database based on a mind map, and wherein each individual search result comprises a given subset of the data objects;
   (ii) selecting, via the GUI, a node representing a data set from a plurality of subsets of data objects to add a score, wherein the data set is shared by at least two search paths corresponding to two of the plurality of individual database searches, and generating a combined analysis by merging the plurality of individual database search results to generate a combined search result, wherein the combined search result comprises a combined subset of the data objects from said data set;
   (iii) determine and assign a weight value for each of the plurality of individual database searches for calculating scores associated with the combined subset of the data objects; and
   (iv) present the combined search result to a user on the GUI, wherein the combined search result comprises the scores associated with the combined subset of the data objects, wherein a score associated with a data object from the combined subset of the data objects is calculated as a weighted sum based at least in part on the weight value assigned to a given individual database search and a count of the data object shown in the combined subset of the data objects.

15. The system of claim 14, wherein the scores associated with the combined subset of the data objects is stored in the relational database in the non-hierarchical manner.

16. The system of claim 14, wherein the weight value is automatically determined based on historical data.

17. The system of claim 14, wherein the combined search result further comprises a timestamp associated with each of the scores and one or more of individual database searches contributing to each score.

18. The system of claim 17, wherein the one or more processors are programmed to further sort the combined search result according to the respective values of the scores or the respective timestamps of the scores.

19. The system of claim 14, wherein the scores are presented in a histogram on the GUI.

20. The system of claim 14, wherein the weight value is received via the GUI.

* * * * *